(12) United States Patent
Takano

(10) Patent No.: US 11,010,868 B2
(45) Date of Patent: May 18, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Kentaro Takano, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 165 days.

(21) Appl. No.: 16/254,619

(22) Filed: Jan. 23, 2019

(65) Prior Publication Data

US 2020/0098088 A1 Mar. 26, 2020

(30) Foreign Application Priority Data

Sep. 20, 2018 (JP) .............................. JP2018-176359

(51) Int. Cl.
*G06T 3/40* (2006.01)
*G06F 3/0484* (2013.01)
*G09G 5/00* (2006.01)

(52) U.S. Cl.
CPC ............ *G06T 3/40* (2013.01); *G06F 3/04845* (2013.01); *G09G 5/005* (2013.01); *G09G 2340/045* (2013.01); *G09G 2354/00* (2013.01)

(58) Field of Classification Search
CPC .......... H04N 1/00442; H04N 2201/325; G06T 3/40; G06F 3/04845; G06F 3/048; G06F 3/04817; G06F 3/1407; G09G 5/005; G09G 2340/045; G09G 2354/00; G09G 3/2003; G09G 2360/16
See application file for complete search history.

(56) References Cited

U.S. PATENT DOCUMENTS

| | | | |
|---|---|---|---|
| 7,391,423 B1* | 6/2008 | Manzari | G06T 3/4092 345/619 |
| 2010/0050114 A1* | 2/2010 | Braun | G06F 16/54 715/788 |
| 2011/0074824 A1* | 3/2011 | Srinivasan | G06F 3/0485 345/660 |
| 2014/0006988 A1 | 1/2014 | Yamamura et al. | |
| 2014/0071160 A1* | 3/2014 | Sugiura | G06F 16/50 345/619 |
| 2018/0121047 A1* | 5/2018 | Goel | G06F 3/0485 |

FOREIGN PATENT DOCUMENTS

| | | |
|---|---|---|
| JP | 2008077171 | 4/2008 |
| JP | 2010170500 | 8/2010 |
| WO | 2012141048 | 10/2012 |

* cited by examiner

*Primary Examiner* — Sanchita Roy
(74) *Attorney, Agent, or Firm* — JCIPRNET

(57) ABSTRACT

An information processing apparatus includes an obtaining unit, a determining unit, and a display controller. The obtaining unit obtains information represented by each of plural thumbnails. The determining unit individually determines a size of each of the plural thumbnails so that the information is identifiable. The display controller performs control so that the plural thumbnails will be displayed in a size greater than or equal to the size determined by the determining unit.

14 Claims, 19 Drawing Sheets

FIG. 5

| R[%] | SIZE β OF THUMBNAIL |
|---|---|
| 10 | 1.9α |
| 20 | 1.8α |
| 30 | 1.7α |
| 40 | 1.6α |
| 50 | 1.5α |
| 60 | 1.4α |
| 70 | 1.3α |
| 80 | 1.2α |
| 90 | 1.1α |
| 100 | α |

31

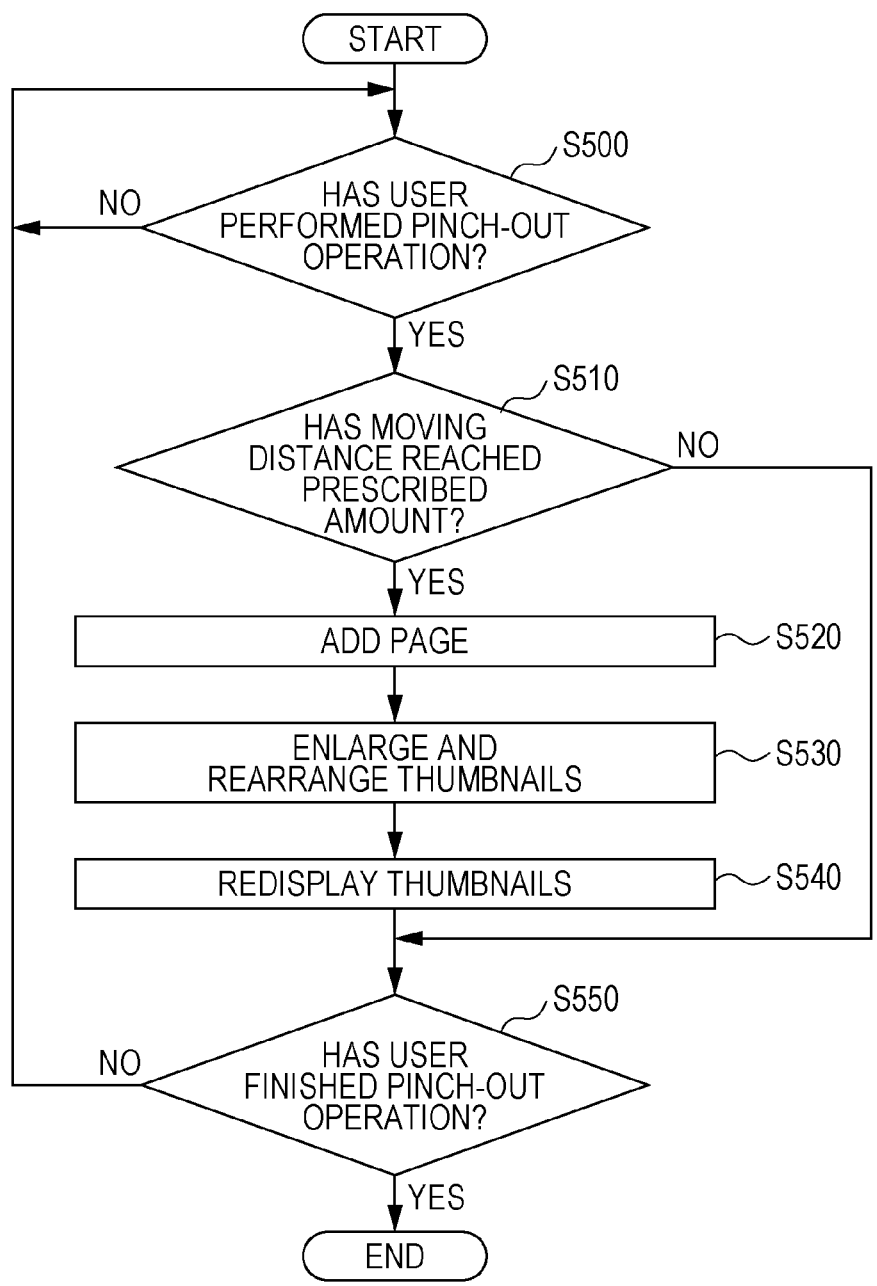

PAGE 1

PAGE 1  PAGE 2

PAGE 1  PAGE 2  PAGE 3

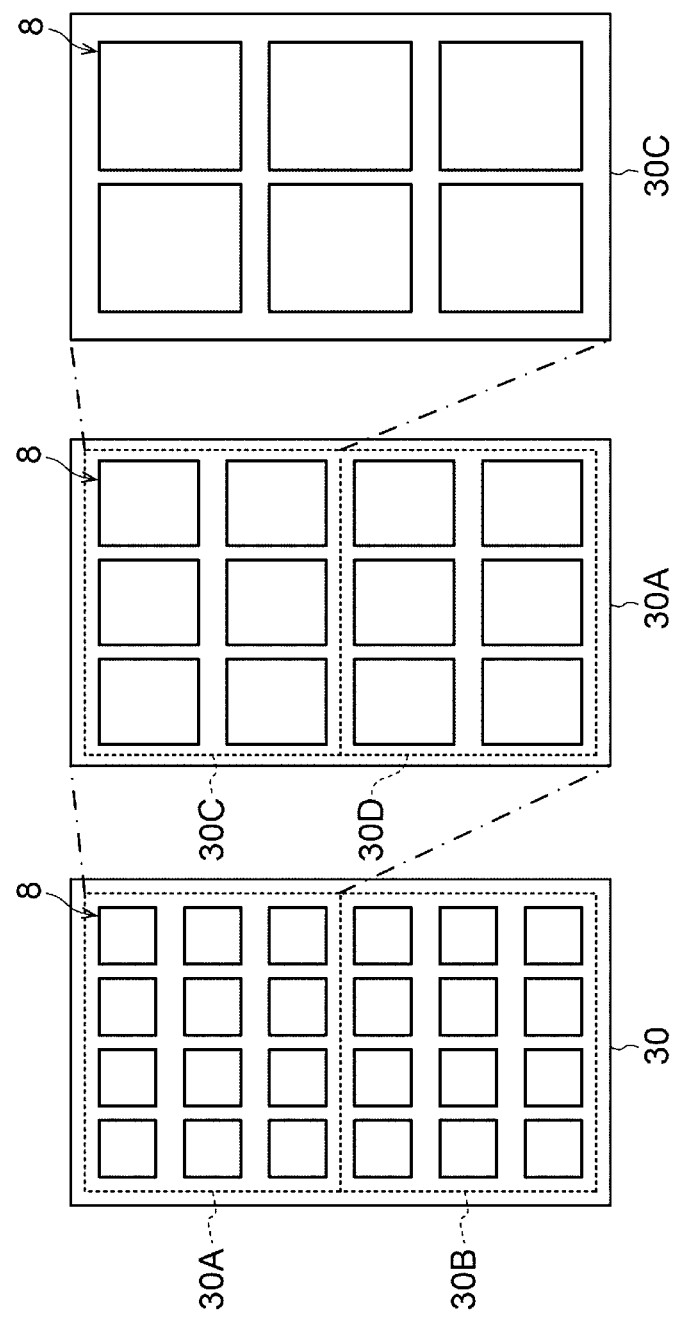

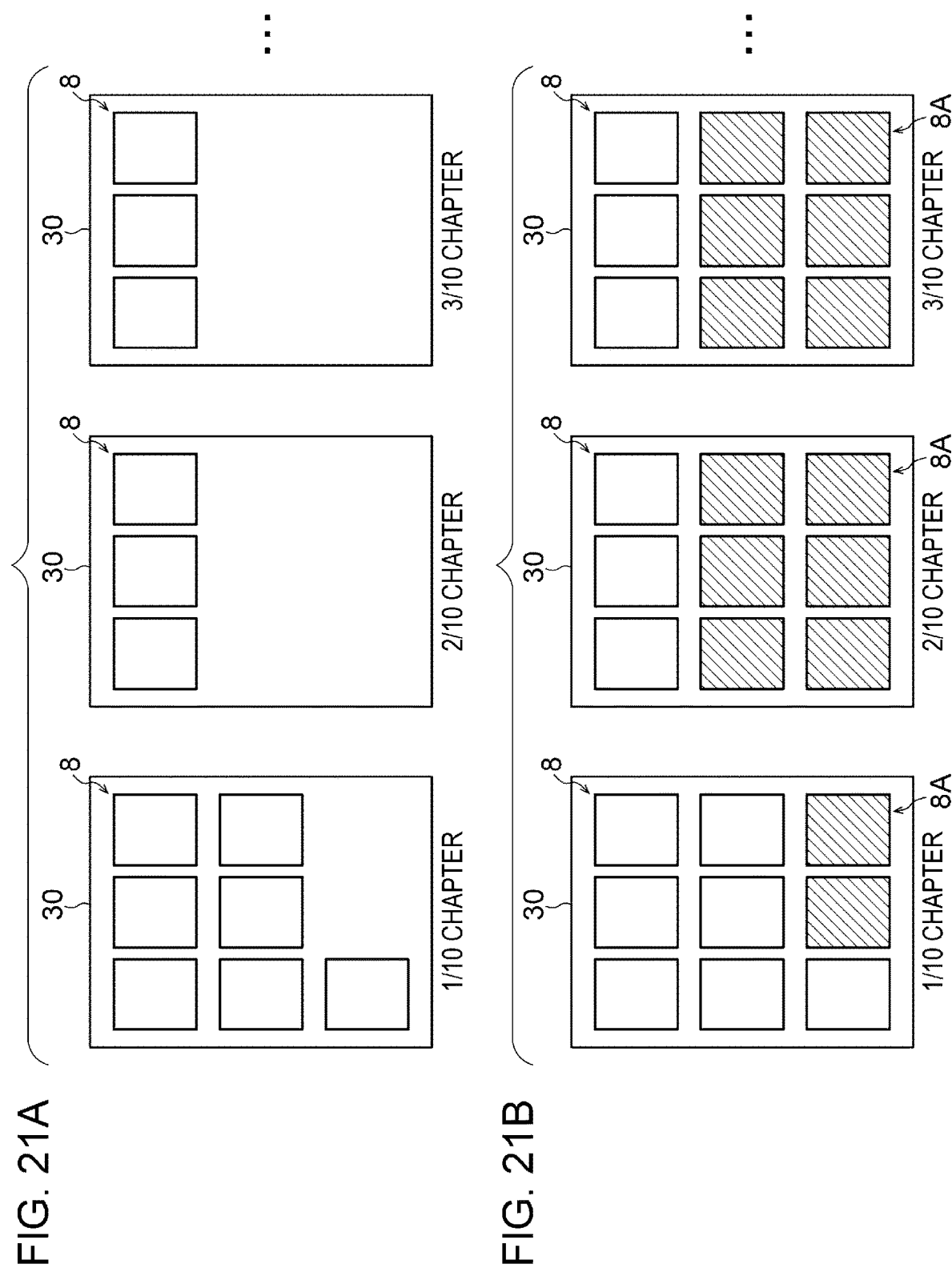

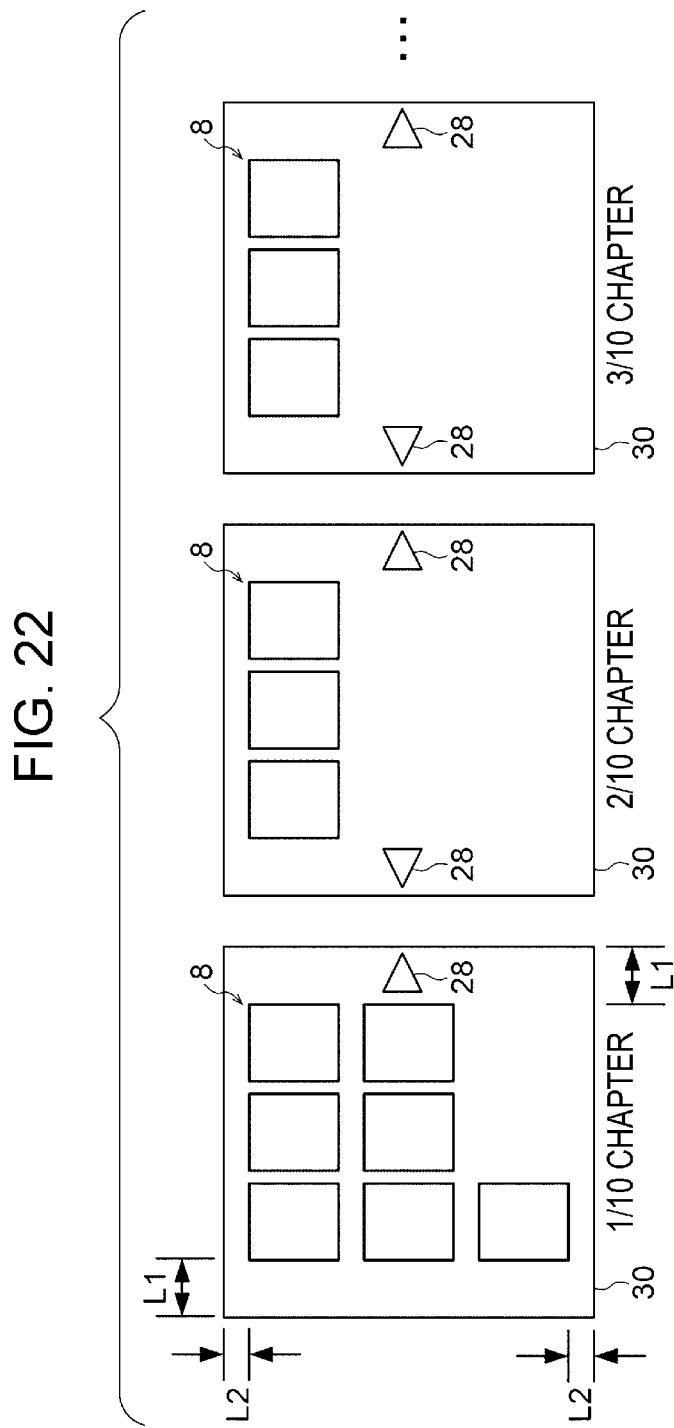

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-176359 filed Sep. 20, 2018.

BACKGROUND

(i) Technical Field

The present disclosure relates to an information processing apparatus and a non-transitory computer readable medium.

(ii) Related Art

Japanese Unexamined Patent Application Publication No. 2008-77171 discloses the following data distribution device. The data distribution device includes a structure analyzer, a determining unit, and a data distributor. The structure analyzer analyzes the structure of input data. The determining unit determines the frequency of the occurrence of data items forming the data structured by the structure analyzer according to the attribute of the data. The data distributor distributes the data by each group of a predetermined number of data items in accordance with the determination result of the determining unit.

Japanese Unexamined Patent Application Publication No. 2010-170500 discloses the following thumbnail generation processing program. The thumbnail generation processing program causes a computer included in a thumbnail generating apparatus that generates thumbnails of content to be displayed by a display device to function as an obtaining unit, a determining unit, an extracting unit, and a generating unit. The obtaining unit obtains the content. The determining unit determines the type of content obtained by the obtaining unit. The extracting unit extracts a portion of the content corresponding to an extraction range of displayed content which has been determined according to the type of content. The generating unit generates a thumbnail corresponding to a display image of the extracted portion.

International Publication No. 2012/141048 discloses the following content display device. The content display device includes a display unit, an input unit, a changing unit, and a moving unit. The display unit displays multiple content items on a screen in a first arrangement pattern having a predetermined arrangement order of individual content items. The input unit receives from a user input of an instruction to change the display size of a certain content item from among the multiple content items displayed on the screen. In response to such an instruction, the changing unit changes the display size of a prescribed number of content items which include the certain content item selected by the user and which are sequentially disposed on the screen according to the predetermined arrangement order. The moving unit moves the prescribed number of content items on the screen so as to display them on the screen in a second arrangement pattern having a predetermined arrangement order which is different from that of the first arrangement pattern.

SUMMARY

If thumbnails to be displayed in a thumbnail view are unconditionally reduced at the same ratio, a user may find it difficult to identify information represented by some thumbnails when such thumbnails are displayed on the screen at the reduced ratio.

Aspects of non-limiting embodiments of the present disclosure relate to an information processing apparatus and a non-transitory computer readable medium that make it easier for a user to identify information represented by each of plural thumbnails displayed in a thumbnail view than when plural thumbnails are unconditionally reduced at the same ratio.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an obtaining unit, a determining unit, and a display controller. The obtaining unit obtains information represented by each of plural thumbnails. The determining unit individually determines a size of each of the plural thumbnails so that the information is identifiable. The display controller performs control so that the plural thumbnails will be displayed in a size greater than or equal to the size determined by the determining unit.

BRIEF DESCRIPTION OF THE DRAWINGS

Exemplary embodiments of the present disclosure will be described in detail based on the following figures, wherein:

FIG. 5 illustrates an example of an enlargement table;

FIG. 16 is a flowchart illustrating an example of resizing processing executed in response to an instruction to adjust the size of thumbnails from a user;

FIG. 20 illustrates thumbnails displayed on a screen in response to the selection from a user;

FIGS. 21A and 21B illustrate an example in which thumbnails are arranged on pages according to the chapter of a document; and FIG. 22 illustrates an example of a receiving region provided at an edge portion of a page to receive an instruction to switch the page.

DETAILED DESCRIPTION

Figure 1:
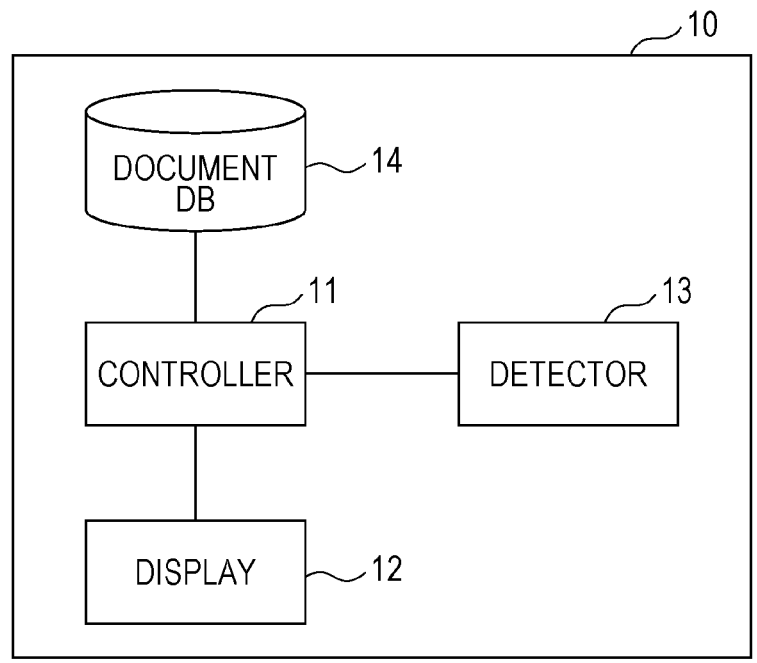
FIG. 1 is a block diagram illustrating an example of the functional configuration of an information processing apparatus according to a first exemplary embodiment.

Exemplary embodiments of the disclosure will be described below with reference to the accompanying drawings. Elements having the same functions are designated by like reference numeral in the drawings, and an explanation thereof will not be repeated. The same operation is designated by like step number in the drawings, and an explanation thereof will not be repeated. "A user" described in the exemplary embodiments is a person instructing an information processing apparatus 10 or 10A to display a document in a thumbnail view.

First Exemplary Embodiment

FIG. 1 is a block diagram illustrating an example of the functional configuration of the information processing apparatus 10 according to a first exemplary embodiment. The information processing apparatus 10 includes functional units such as a controller 11, a display 12, and a detector 13, and a document database (DB) 14.

The controller 11 obtains a document selected by a user among documents stored in the document DB 14, and generates thumbnails 8 (see FIGS. 10A and 10B, for example) of individual pages of the document. Each thumbnail 8 indicates the content of a corresponding page. The controller 11 first adjusts the sizes of the generated thumbnails 8 so that the thumbnails 8 can be displayed on a screen in the same size and without overlapping each other. If the size of each thumbnail 8 is smaller than a threshold $\alpha$, the controller 11 performs control to enlarge each thumbnail 8 to a size greater than or equal to the threshold $\alpha$.

The controller 11 then causes the display 12 to display the enlarged thumbnails 8 on the screen. That is, the controller 11 is an example of a determining unit and an example of a display controller according to the first exemplary embodiment. The controller 11 is also an example of an obtaining unit according to the first exemplary embodiment because it obtains information represented by thumbnails 8 to adjust the size of the thumbnails 8. Details of the adjustment of the size of thumbnails 8 will be discussed later.

Before displaying the thumbnails 8 enlarged to a size greater than or equal to the threshold $\alpha$ on the screen, the controller 11 first disposes the thumbnails 8 on a page 30 (see FIGS. 10A and 10B, for example) adjusted to the size of the screen so as to determine the display positions of the thumbnails 8 on the screen. Then, the controller 11 causes the display 12 to display the thumbnails 8 on the screen. If it is not possible to include all the thumbnails 8 within one page 30, the controller 11 distributes the thumbnails 8 over plural pages 30 to display them on the screen.

The display 12 displays thumbnails 8 enlarged to a size greater than or equal to the threshold $\alpha$ on the screen of a display unit 6, which will be discussed later, under the control of the controller 11.

The detector 13 is an example of a detector according to the first exemplary embodiment. The detector 13 detects the proportion of an image included in a thumbnail 8 to the total size of the thumbnail 8. "An image" in the first exemplary embodiment refers to information represented by drawings, such as figures, photos, and illustrations. In other words, "an image" is information other than information represented by characters. If characters are contained in a drawing, such as in an illustration, they are associated with the drawing and are used for giving an explanation of the drawing. In this sense, a combination of the drawing and the characters is "an image".

The document DB 14 is a database for managing documents from which the controller 11 generates thumbnails 8. The document DB 14 stores documents sent from an external device via a communication unit 2, which will be discussed later, connected to a communication line (not shown). The document DB 14 also stores documents created by the information processing apparatus 10.

A database may be an application for managing documents in association with a predetermined primary key. However, "the database" in the first exemplary embodiment does not necessarily mean managing of documents by using commercial or non-commercial database applications, but is any of the systems for storing and managing documents. For example, a file system used for managing documents is an example of the database in the first exemplary embodiment. However, the use of a database application for the information processing apparatus 10 is not excluded.

The document DB 14 may not necessarily be included in the information processing apparatus 10, and instead, it may be constructed in an external device connected to a communication line (not shown). In this case, the information processing apparatus 10 obtains a document selected by a user from the external device via the communication unit 2.

Figure 2:
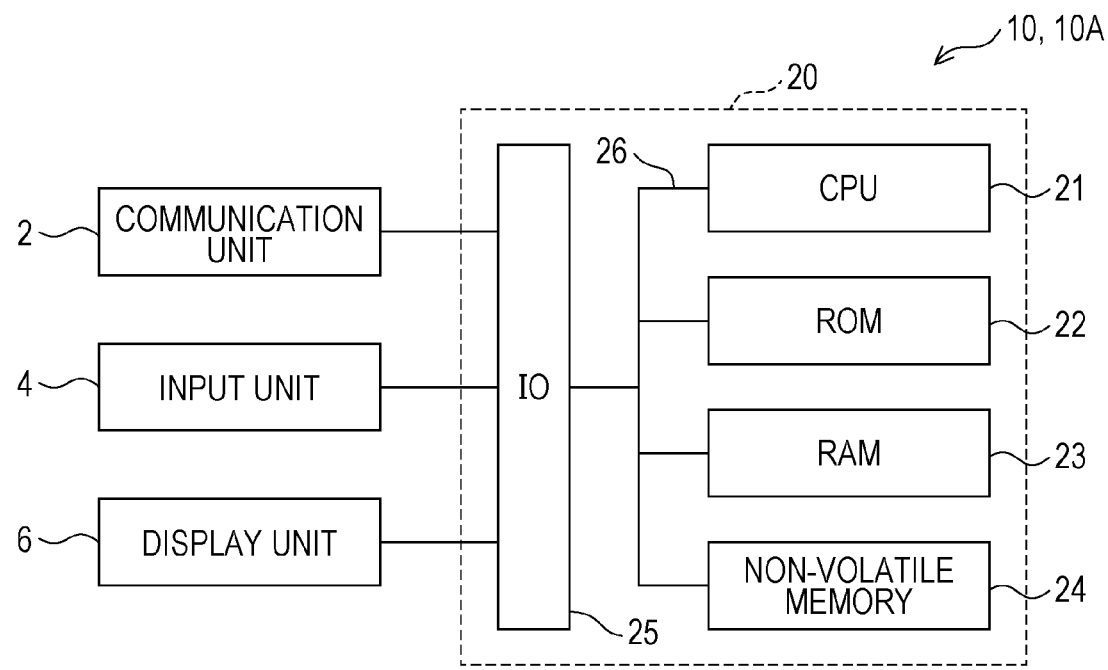
FIG. 2 is a block diagram illustrating an example of major components of the electrical system configuration of the information processing apparatus.

The information processing apparatus 10 shown in FIG. 1 is constituted by a computer 20, for example. FIG. 2 is a block diagram illustrating an example of the major components of the electrical system configuration of the information processing apparatus 10.

The computer 20 includes a central processing unit (CPU) 21, a read only memory (ROM) 22, a random access memory (RAM) 23, a non-volatile memory 24, and an input-output interface (IO) 25. The CPU 21 serves as functional units of the information processing apparatus 10 according to the first exemplary embodiment. The ROM 22 stores an information processing program. The RAM 23 is used as a temporary work area for the CPU 21. The CPU 21, the ROM 22, the RAM 23, the non-volatile memory 24, and the IO 25 are connected to one another via a bus 26.

The non-volatile memory 24 is an example of a storage device that can retrieve information even after power supply is terminated. In the first exemplary embodiment, a semiconductor memory, for example, is used for the non-volatile memory 24, but a hard disk may alternatively be used. The document DB 14 is constructed in the non-volatile memory 24.

A communication unit 2, an input unit 4, and a display unit 6, for example, are connected to the IO 25.

The communication unit 2 is connected to a communication line (not shown) and has a communication protocol for obtaining a document from an external device connected to this communication line.

The input unit 4 is an input device which receives an instruction sent from an operator directly operating the information processing apparatus 10 and informs the CPU 21 of the content of the instruction. Examples of the input unit 4 are a button, a keyboard, a mouse, a touchscreen, and a laser pointer.

The display unit 6 is a display device which displays information processed by the CPU 21. Examples of the display unit 6 are a liquid crystal display, an organic electroluminescence (EL) display, and a projector which displays images on a wall, for example.

The operation of the information processing apparatus 10 according to the first exemplary embodiment will now be described below with reference to FIG. 3.

Figure 3:
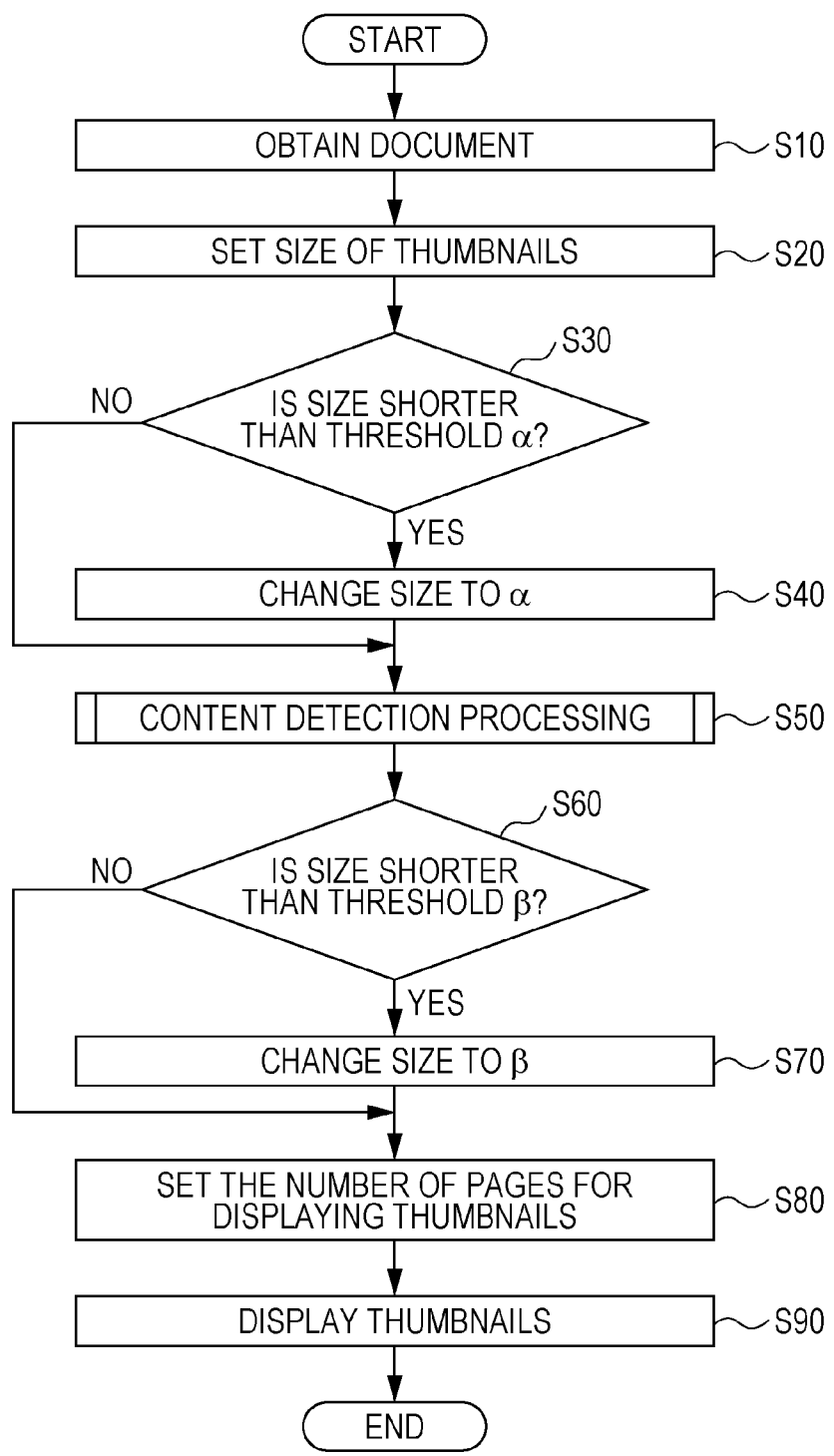
FIG. 3 is a flowchart illustrating an example of thumbnail processing.

FIG. 3 is a flowchart illustrating an example of thumbnail processing executed by the CPU 21 in response to an instruction to display a document as thumbnails from a user.

An information processing program describing thumbnail processing has been stored in the ROM 22, for example. The CPU 21 reads the information processing program from the ROM 22 and executes thumbnail processing.

In step S10, the CPU 21 obtains a document selected by a user from the document DB 14.

In step S20, the CPU 21 generates thumbnails 8 of the individual pages of the document obtained in step S10. Pages forming a document are different from a page 30 on which generated thumbnails are arranged and displayed on the screen, and will hereinafter be called "document pages".

The CPU 21 adjusts the size of each thumbnail 8 so that the generated thumbnails 8 can be disposed within one page 30 in the same size and without overlapping each other. The thumbnails 8 to be arranged on a page 30 are not limited to a particular shape and may be a circle or a triangle. The first exemplary embodiment will be discussed, assuming that the shape of the thumbnails 8 is a rectangle.

In step S30, the CPU 21 judges whether the size of the thumbnails 8 arranged on the page 30 in step S20 is smaller than the threshold $\alpha$. The size of the thumbnails 8 may be represented by the length of the shortest side or the area of the thumbnails 8. In the first exemplary embodiment, a length of a thumbnail 8 will be used as the size of the thumbnail 8.

When selecting a thumbnail 8 on the screen by using an indicator, a user may unintentionally select a wrong thumbnail 8 other than the one that the user has intended. The threshold $\alpha$ has been set to a value large enough not to make a user select a wrong thumbnail 8, for example, a thumbnail 8 next to the one that the user has intended to select.

If a touchscreen is used as the input unit 4 disposed on the surface of the display unit 6 for displaying the screen of thumbnails 8, the indicator for selecting a thumbnail 8 is a user's finger. In this case, it has been verified by experiment, based on the size of the contact area of a finger and a screen, that a wrong selection of a thumbnail 8 is less likely to occur if thumbnails 8 have 0.9 square centimeters or greater. The threshold $\alpha$ is thus set to be 0.9 cm, for example. The threshold $\alpha$ is an example of a predetermined size in the first exemplary embodiment.

Nevertheless, the threshold $\alpha$ is not limited to 0.9 cm and may be set to another value. The threshold $\alpha$ has been stored in the non-volatile memory 24, for example.

If the length of any of the sides of the thumbnails 8 is smaller than the threshold $\alpha$, the CPU 21 proceeds to step S40.

In step S40, the CPU 21 enlarges each thumbnail 8 until the length of a side smaller than the threshold $\alpha$ reaches the threshold $\alpha$. In the first exemplary embodiment, "enlarging" means that a thumbnail 8 is enlarged vertically and horizontally with the same scale while maintaining the aspect ratio.

The size and the resolution of the screen determine how many pixels will be added to make the thumbnail 8 enlarge to the length equal to the threshold $\alpha$.

The resolution of the screen is represented by the number of pixels contained in the screen in the vertical direction and in the horizontal direction. High definition (HD) resolution, for example, is represented by the number of pixels, such as 1280×720. That is, if two screens have the same resolution but are different in size, the inter-pixel distance becomes different. To enlarge the length of a side of the thumbnail 8 to the threshold $\alpha$, the CPU 21 calculates pixels per inch (ppi) based on the size and the resolution of the screen.

The CPU 21 has obtained the size and the resolution of the screen from the display unit 6 and stored them in the non-volatile memory 24. Depending on the type of operating system (OS) executing the information processing program, ppi may be obtained from the OS by using a dedicated application programming interface (API).

If it is found in step S30 that the size of the thumbnails 8 is not smaller than the threshold $\alpha$, it means that the size of the thumbnails 8 is already greater than or equal to the threshold $\alpha$, and the CPU 21 proceeds to step S50 by skipping step S40.

In step S50, the CPU 21 executes content detection processing for further adjusting the size of each thumbnail 8 in terms of the visibility of the thumbnails 8. In content detection processing, the CPU 21 sets a threshold $\beta$ ($\beta \geq \alpha$) representing a suitable size of each thumbnail 8 from which the user can recall the content of the document by looking at the thumbnail 8. Details of content detection processing will be discussed later.

In step S60, the CPU 21 judges whether the size of the thumbnails 8 is smaller than the threshold $\beta$ set in content detection processing in step S50. If the length of any of the sides of the thumbnails 8 is smaller than the threshold $\beta$, the CPU 21 proceeds to step S70.

In step S70, for each thumbnail 8 having a length smaller than the threshold $\beta$, the CPU 21 enlarges the entire thumbnail 8 until the length reaches the threshold $\beta$. As in step S40, the CPU 21 enlarges the thumbnail 8 by using ppi obtained based on the size and the resolution of the screen.

If it is found in step S60 that the size of the thumbnails 8 is not smaller than the threshold $\beta$, it means that the size of the thumbnails 8 is already greater than or equal to the threshold $\beta$, and the CPU 21 proceeds to step S80 by skipping step S70.

In step S80, based on the size and the number of thumbnails 8, the CPU 21 sets a minimum number of pages required for displaying the thumbnails 8 when the thumbnails 8 enlarged to a size greater than or equal to the threshold $\beta$ are sequentially displayed on a page 30 from the head of the document pages without overlapping each other.

In step S90, the CPU 21 arranges the thumbnails 8 on one or plural pages 30 set in step S80 in the consecutive order of document pages. The CPU 21 then causes the display unit 6 to display the head page 30, for example, on the screen. If the thumbnails 8 are distributed over plural pages 30, in response to an instruction to change the page 30 from a user, the CPU 21 causes the display unit 6 to display the page 30 selected by the user on the screen.

Then, the CPU 21 completes thumbnail processing shown in FIG. 3. The size of each thumbnail 8 displayed on the screen is greater than or equal to the threshold β. This may reduce the possibility that a user will unintentionally select an incorrect thumbnail 8, in comparison with when the size of the thumbnails 8 is smaller than the threshold α, and that the user will not be able to recall the content of the document from the thumbnails 8.

To make the user recall the content of the document, the size of the thumbnails 8 greater than or equal to the threshold β is required. If the size of the thumbnails 8 is found to be greater than the threshold β in step S20, the CPU 21 may reduce the size of the thumbnails 8 to be close to the threshold β. Even in this case, the operability and the visibility of the thumbnails 8 are still maintained.

Figure 4:
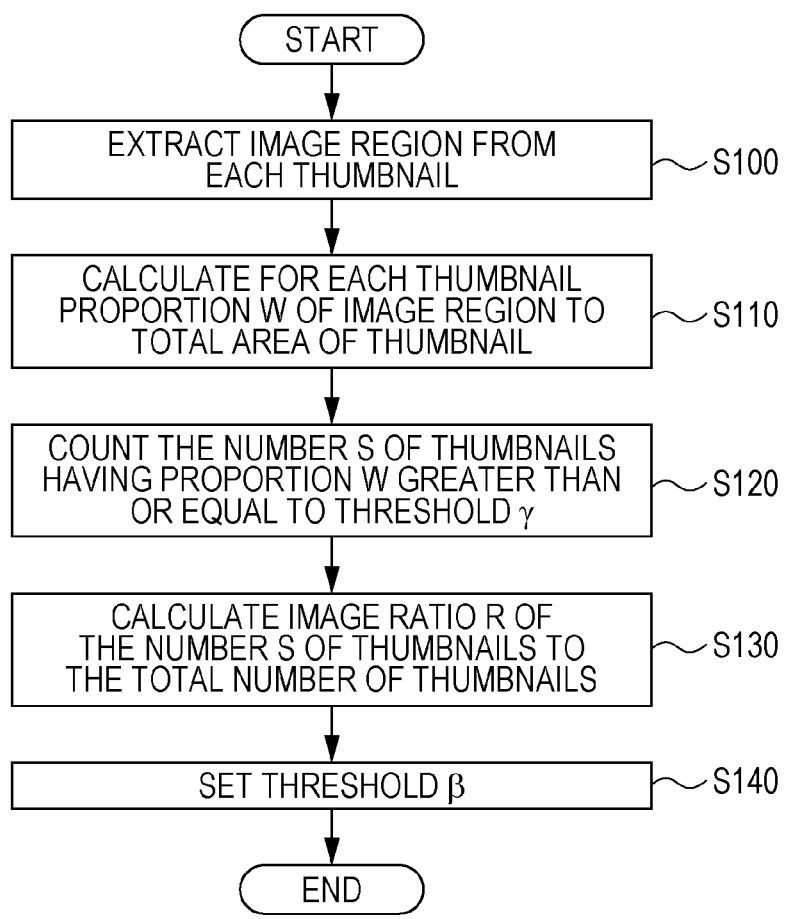
FIG. 4 is a flowchart illustrating an example of content detection processing.

Content detection processing in step S50 will now be discussed below. FIG. 4 is a flowchart illustrating an example of content detection processing executed by the CPU 21.

In step S100, for each thumbnail 8, the CPU 21 extracts a region where an image is disposed (image region) from the thumbnail 8 and stores the extracted image region in the RAM 23 in association with the corresponding thumbnail 8.

In step S110, for each thumbnail 8, the CPU 21 calculates the proportion of the image region to the total area of the corresponding thumbnail 8 (hereinafter simply called the proportion W of the image region or the proportion W) associated with each other in step S100. The proportion W of the image region is an example of an index representing the ratio of an image to the total area of a corresponding thumbnail.

Images are more likely to stay in one's memory than characters. A user thus tends to recall the content of a document more easily by looking at an image rather than at characters within a thumbnail 8.

Based on this presumption, in step S120, the CPU 21 first counts the number S of thumbnails 8 in which the proportion W of the image region is greater than or equal to a threshold γ. The threshold γ is a reference value representing the smallest proportion W that is likely to make a user recall the content of the document based on the image. The threshold γ has been calculated by experiment using the actual information processing apparatus 10 or by computer simulations based on the design specifications of the information processing apparatus 10. The threshold γ has been stored in the non-volatile memory 24, for example.

In step S130, the CPU 21 calculates the ratio R of the number S of thumbnails 8 counted in step S120 to the total number of thumbnails 8 of the document obtained in step S10 (hereinafter such a ratio will be called the image ratio R).

In step S140, the CPU 21 sets the threshold β by using the image ratio R calculated in step S130. More specifically, the CPU 21 sets the threshold β by referring to an enlargement table 31 stored in the non-volatile memory 24.

FIG. 5 illustrates an example of the enlargement table 31. The enlargement table 31 is a table in which the image ratio R and the threshold β are associated with each other. As the image ratio R is greater, the threshold β is set to become smaller. In the enlargement table 31 shown in FIG. 5, for example, when the image ratio R is 10%, 1.9α is set as the threshold β, and when the image ratio R is 100%, α is set as the threshold β.

The relationship between the image ratio R and the threshold β is set in this manner because of the following reason. A higher image ratio R indicates a larger area of images contained in a document. As discussed above, images are more likely to stay in one's memory than characters. If the image ratio R is relatively high, a user tends to be able to recall the content of the document even with a smaller size of the thumbnails 8. Associating the threshold β with the image ratio R in this manner prevents the unnecessary enlargement of the size of the thumbnails 8 and do not increase the number of pages for displaying the thumbnails 8. In other words, more thumbnails 8 can be displayed within one page.

According to the enlargement table 31, even when the image ratio R is 100%, the threshold β does not become smaller than the threshold α. This is for the operability of the thumbnails 8.

The CPU 21 refers to the enlargement table 31 and sets the value associated with the image ratio R calculated in step S130 as the threshold β.

Then, the CPU 21 completes content detection processing shown in FIG. 4.

In step S140 in FIG. 4, the CPU 21 obtains the threshold β by referring to the enlargement table 31. However, this is only an example. The CPU 21 may obtain the threshold β by using a predetermined function expression for calculating the threshold β as a result of inputting a variable indicating the image ratio R.

In the information processing apparatus 10 according to the first exemplary embodiment, the size of each thumbnail 8 is first enlarged to be greater than or equal to the threshold α, and then, the thumbnails 8 are arranged on a page in the consecutive order of document pages without overlapping each other. Before displaying the thumbnails 8, the information processing apparatus 10 adjusts the size of each thumbnail 8 based on the content of a document, and more specifically, based on the proportion W of an image to the total size of a corresponding thumbnail 8.

First Modified Example of First Exemplary Embodiment

In the above-described first exemplary embodiment, the size of each thumbnail 8 is adjusted based on the proportion W of an image to the total size of a corresponding thumbnail 8. However, the content of document that may be used for adjusting the size of a thumbnail 8 is not restricted to the proportion W. For example, by using the visual characteristics of characters contained in thumbnails 8, the information processing apparatus 10 may further adjust the size of the thumbnails 8 which has been adjusted based on the proportion W.

Figure 6:
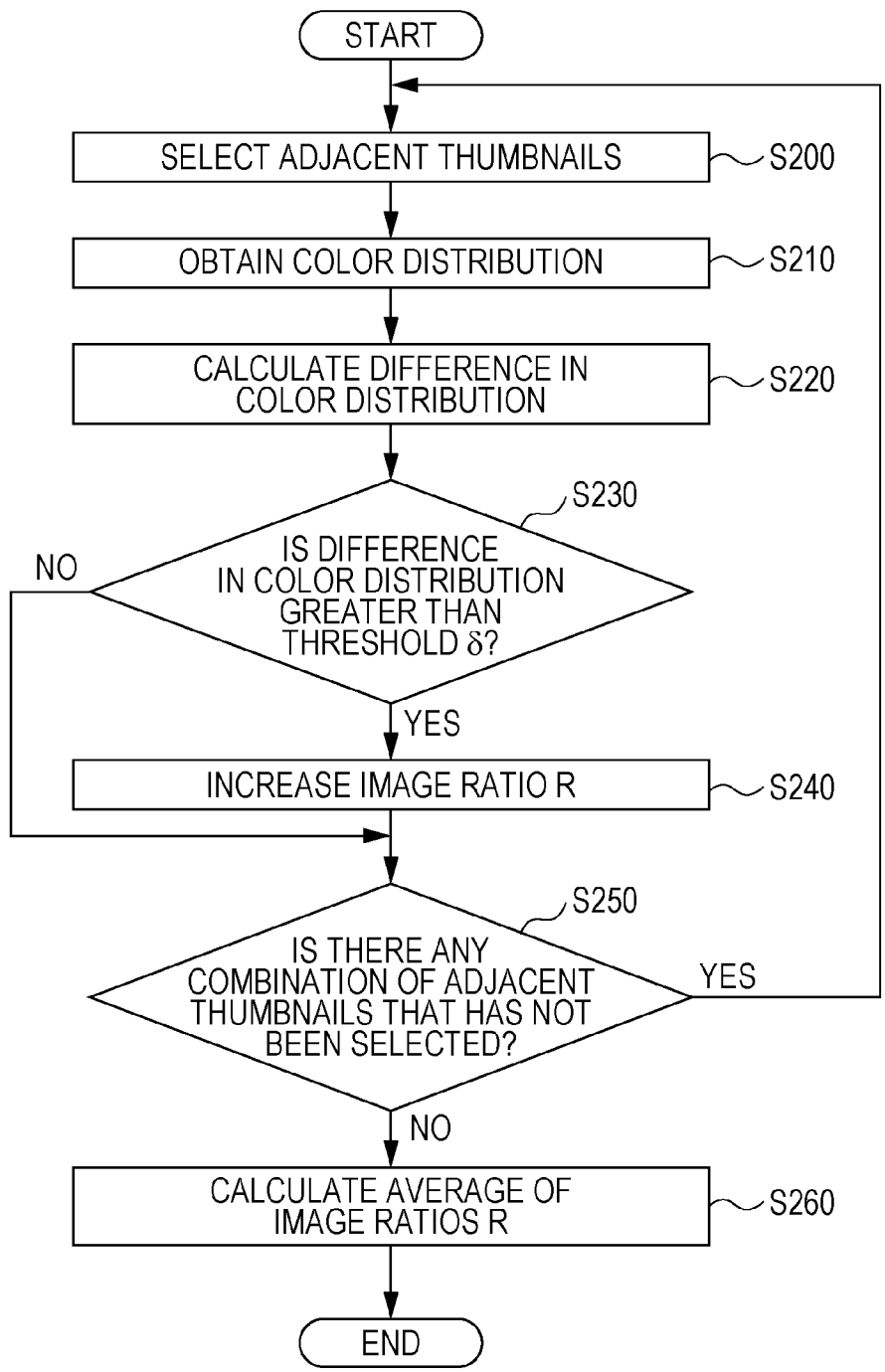
FIG. 6 is a flowchart illustrating an example of resizing processing using the color distribution of characters.

FIG. 6 is a flowchart illustrating an example of resizing processing executed by the CPU 21. In resizing processing in FIG. 6, the size of thumbnails 8 is adjusted based on the difference in the color of characters between adjacent thumbnails 8 arranged on a page 30. Resizing processing in FIG. 6 is executed by the CPU 21 between steps S130 and S140 of content detection processing in FIG. 4, for example.

An information processing program describing resizing processing has been stored in the ROM 22, for example. The CPU 21 reads the information processing program from the ROM 22 and executes resiting processing.

In step S200, the CPU 21 selects two thumbnails 8 positioned adjacent to each other (hereinafter simply called adjacent thumbnails) when all thumbnails 8 are arranged on a page 30 and are displayed on the screen.

In step S210, the CPU 21 obtains the color distribution of the characters in each of the adjacent thumbnails selected in step S200. The colors of pixels forming the screen are represented by pixel values of red (R), green (G), and blue (B). The content of a thumbnail 8 displayed on the screen is indicated by a set of colors of pixels included in a region where the thumbnail 8 is disposed. Pixel numbers are appended to the pixels of an image included in each thumbnail 8. In this case, the same pixel number is appended to the pixels of thumbnails 8 located at the same position when the thumbnails 8 are superposed on each other. Then, a color distribution in which the pixel number is arranged on the horizontal axis and the pixel value of each of RGB colors is arranged on the vertical axis is obtained for each thumbnail 8.

Figure 7:
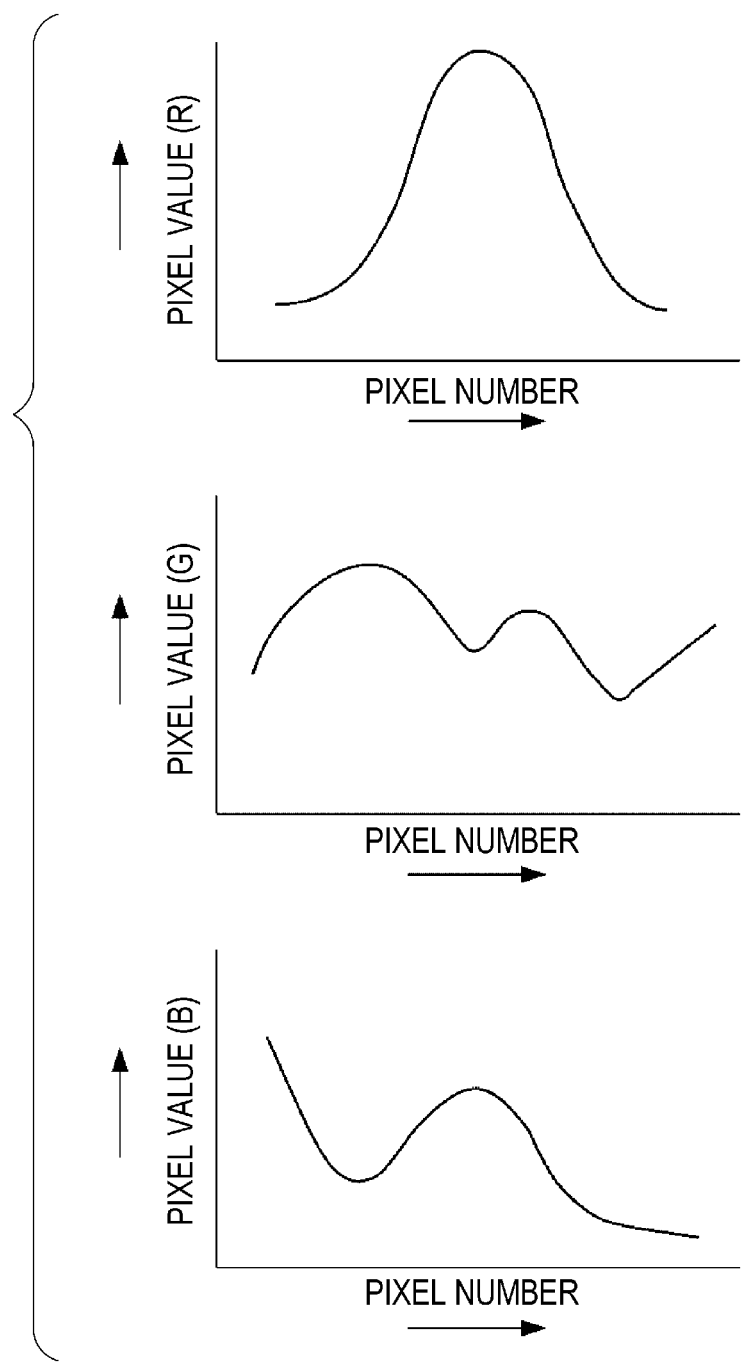
FIG. 7 shows graphs illustrating an example of the color distribution of characters.

FIG. 7 shows graphs illustrating an example of the color distribution of the characters contained in a thumbnail 8. In each thumbnail 8, the pixel values of pixels forming an image are set to be 0, so that the color distribution only representing the characters can be obtained.

The color distribution of the characters contained in a thumbnail 8 may not necessarily be represented as shown in FIG. 7. For example, the color distribution may be represented by the pixel values of other colors, such as cyan, magenta, yellow, and black.

In step S220, for each of the RGB colors, the CPU 21 calculates the difference in the color distribution between adjacent thumbnails, and calculates the average of the differences in the color distributions of the RGB colors. Hereinafter, the average difference in the color distribution will be called the difference in the color distribution between adjacent thumbnails.

In step S230, the CPU 21 judges whether the difference in the color distribution calculated in step S220 exceeds a threshold δ. The threshold δ is a reference value for a user to recall the content of the document. More specifically, with a value exceeding the threshold δ, a user may be able to recall the content of the document based on the difference in the color of characters between adjacent thumbnails. The threshold δ has been calculated by experiment using the actual information processing apparatus 10 or by computer simulations based on the design specifications of the information processing apparatus 10. The threshold δ has been stored in the non-volatile memory 24, for example.

If the difference in the color distribution is found to be greater than the threshold δ in step S230, the CPU 21 proceeds to step S240.

If the difference in the color distribution is greater than the threshold δ, this means that the user can recall the content of the document, not only from the image in the thumbnail 8, but also from the colors of the characters in the thumbnail 8. Even if the value of the threshold β which has been set based on the proportion W of the image region is decreased, the probability that the user will recall the content of the document may remain the same.

Then, in step S240, the CPU 21 increases the image ratio R calculated in step S130 of FIG. 4 so as to decrease the threshold β calculated only based on the proportion W. As the amount by which the difference in the color distribution is greater than the threshold δ is larger, the CPU 21 increases the image ratio R to be greater. The CPU 21 stores the increased image ratio R in the RAM 23 in association with the adjacent thumbnails.

If the difference in the color distribution is found to be smaller than or equal to the threshold δ in step S230, the CPU 21 stores the image ratio R calculated in step S130 of FIG. 4 in association with the adjacent thumbnails, and proceeds to step S250 by skipping step S240.

In step S250, the CPU 21 judges whether there is any combination of adjacent thumbnails that has not been selected. If such a combination is found in step S250, the CPU 21 returns to step S200.

Steps S200 through S250 are repeated until all the combinations of adjacent pixels are selected in step S200, and then, the image ratio R corresponding to each combination of adjacent pixels is stored in the RAM 23.

In step S260, the CPU 21 calculates the average of the image ratios R of the individual combinations of adjacent thumbnails stored in the RAM 23.

Then, the CPU 21 completes resizing processing shown in FIG. 6.

The average image ratio R calculated in step S260 is used in step S140 of FIG. 4. As more combinations of adjacent thumbnails are found to have a difference in the color distribution greater than the threshold δ, the threshold β calculated only based on the proportion W is decreased to be smaller. That is, as more combinations of adjacent thumbnails are found to have a difference in the color distribution greater than the threshold δ, the size of the thumbnail 8 becomes smaller than that adjusted only based on the proportion W. In other words, more thumbnails 8 can be displayed within one page.

Second Modified Example of First Exemplary Embodiment

In the above-described first modified example of the first exemplary embodiment, resizing processing for adjusting the size of each thumbnail 8 based on the color difference of characters between adjacent thumbnails 8 has been discussed. However, the visual characteristics of characters that may be used for adjusting the size of thumbnails 8 are not restricted to the difference in the color of characters. For example, by using the degree of similarity concerning the arrangement of characters contained in thumbnails 8, the information processing apparatus 10 may further adjust the size of the thumbnails 8 adjusted only based on the proportion W of the image region.

Figure 8:
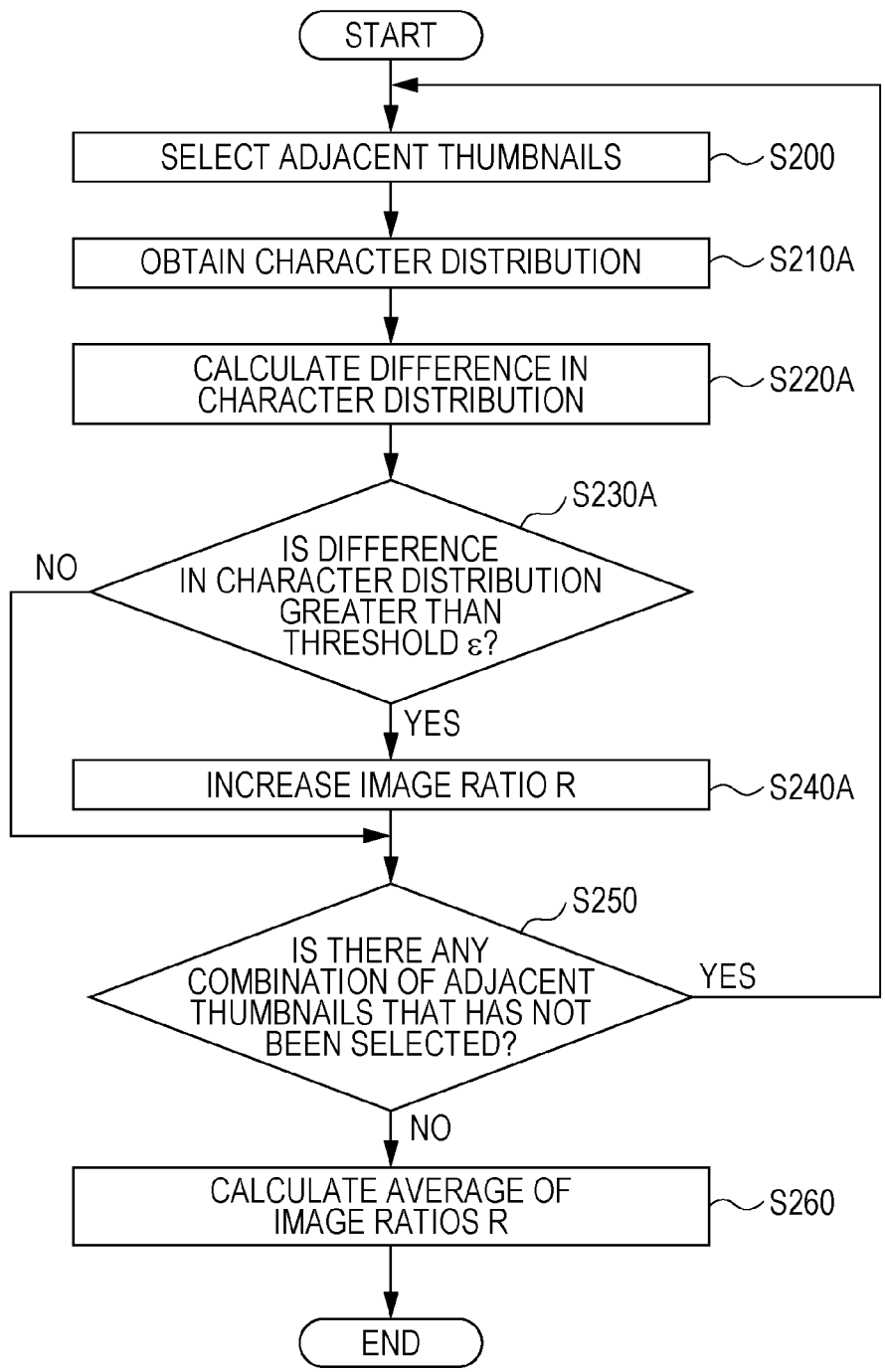
FIG. 8 is a flowchart illustrating an example of resizing processing using the degree of similarity concerning the arrangement of characters.

FIG. 8 is a flowchart illustrating another example of resizing processing executed by the CPU 21. In resizing processing in FIG. 8, the size of each thumbnail 8 is adjusted based on the degree of similarity concerning the arrangement of characters between thumbnails 8 positioned adjacent to each other when all thumbnails 8 are arranged on a page 30 in the consecutive order of document pages.

Resizing processing in FIG. 8 is different from that in FIG. 6 in that steps S210 through S240 are replaced by steps S210A through S240A, respectively.

After the CPU 21 has selected adjacent thumbnails in step S200, it executes step S210A.

In step S210A, the CPU 21 obtains the character distribution of each of the adjacent thumbnails. The character distribution is a distribution of the positions of characters in a thumbnail 8. The character distribution is represented by the following graph, for example. In the graph, the pixel number is arranged on the horizontal axis, and the value indicating whether the pixel corresponding to the pixel number represents a character is arranged on the vertical axis. In the character distribution, for a pixel representing a character, the value is set to be 1, and for a pixel which does not represent a character, such as for a pixel representing a blank or an image, the value is set to be 0. A blank is a region where neither of an image nor a character is disposed.

In step S220A, the CPU 21 calculates the difference in the character distribution between the adjacent thumbnails obtained in step S210A. In this case, for each pixel number, the CPU 21 first calculates the difference in the value of each pixel between the adjacent thumbnails. Then, the sum or the average of the differences calculated for the individual pixel numbers of the adjacent thumbnails is used as the difference in the character distribution.

In step S230A, the CPU 21 judges whether the difference in the character distribution calculated in step S220A exceeds a threshold ε. The threshold ε is a reference value for a user to recall the content of the document. More specifically, with a value exceeding the threshold ε, a user may be able to recall the content of the document based on the difference in the arrangement of characters between adjacent thumbnails. The threshold ε has been calculated by experiment using the actual information processing apparatus 10 or by computer simulations based on the design specifications of the information processing apparatus 10. The threshold ε has been stored in the non-volatile memory 24, for example.

If the difference in the character distribution is found to be greater than the threshold ε in step S230A, the CPU 21 proceeds to step S240A.

If the difference in the character distribution is greater than the threshold ε, this means that the user can recall the content of the document, not only from the image in the thumbnail 8, but also from the arrangement of the characters in the thumbnail 8. Even if the value of the threshold β which has been set based on the proportion W of the image region is decreased, the probability that the user will recall the content of the document may remain the same.

Then, in step S240A, the CPU 21 increases the image ratio R calculated in step S130 of FIG. 4 so as to decrease the threshold β calculated only based on the proportion W. As the amount by which the difference in the character distribution is greater than the threshold ε is larger, the CPU 21 increases the image ratio R to be greater. The CPU 21 stores the increased image ratio R in the RAM 23 in association with the adjacent thumbnails.

If the difference in the character distribution is found to be smaller than or equal to the threshold ε in step S230A, the CPU 21 stores the image ratio R calculated in step S130 in FIG. 4 in association with the adjacent thumbnails, and proceeds to step S250 by skipping step S240A.

As discussed with reference to FIG. 6, steps S200 through S250 are repeated until all the combinations of adjacent pixels are selected in step S200. Then, in step S260, the CPU 21 calculates the average of the image ratios R of the individual combinations of adjacent thumbnails stored in the RAM 23.

Then, the CPU 21 completes resizing processing shown in FIG. 8.

As the degree of similarity concerning the arrangement of characters between adjacent thumbnails is lower, the size of the thumbnails 8 becomes smaller than that adjusted only based on the proportion W. In other words, more thumbnails 8 can be displayed within one page.

In resizing processing shown in FIG. 8, the degree of similarity concerning the arrangement of characters is represented by the difference in the character distribution. However, the degree of similarity may be calculated by using a known technique, such as template matching.

In resizing processing in FIG. 8, the size of the thumbnails 8 is adjusted by using the degree of similarity concerning the arrangement of characters. Viewing from a different perspective, the size of the thumbnails 8 is adjusted by using the degree of similarity based on the blank distribution. This will be explained more specifically. The information processing apparatus 10 may obtain the blank distribution of each of the adjacent thumbnails in step S210A. If the difference in the blank distribution between the adjacent thumbnails is found to be greater than the threshold ε in step S230A, this means that the user can recall the content of the document, not only from the image in the thumbnail 8, but also from the arrangement of blanks in the thumbnail 8. The information processing apparatus 10 may thus execute step S240A. As the degree of similarity concerning the blank distribution between adjacent thumbnails is lower, the size of the thumbnail 8 becomes smaller than that adjusted only based on the proportion W. In other words, more thumbnails 8 can be displayed within one page.

The information processing apparatus 10 may adjust the difference in the color distribution of characters, the character distribution, or the blank distribution by using at least one of the attributes of characters, such as the thickness, size, and type of characters. The type of characters is also called the font.

For example, concerning the difference in the color distribution of characters, if at least one of the thickness, size, and type of characters of one thumbnail is different from that of the other thumbnail, the degree of similarity between the adjacent thumbnails becomes lower than that indicated only by the difference in the color distribution of characters. As the degree of similarity concerning at least one of the thickness, size, and type of characters between adjacent thumbnails is lower, the information processing apparatus 10 may increase the difference in the color distribution of characters between the adjacent thumbnails to be larger. Likewise, adjustment may be made to the difference in the character distribution and that in the blank distribution in a similar manner.

The type of characters used for headings of a document is likely to be different from that in the other portion of the document. Larger and thicker characters tend to be used for headings. Headings in a document are thus more likely to stay in a user's memory. From this point of view, too, the degree of similarity concerning at least one of the thickness, size, and type of characters between adjacent thumbnails may be calculated. As the calculated degree of similarity is lower, the user can recall the content of the document more easily. As a result, the size of the thumbnail 8 can be set to be smaller.

Third Modified Example of First Exemplary Embodiment

In the above-described first exemplary embodiment, the size of thumbnails 8 generated from the same document is set to be the same. However, the sizes of the thumbnails 8 may be set to be different in accordance with the content of the document page.

Figure 9:
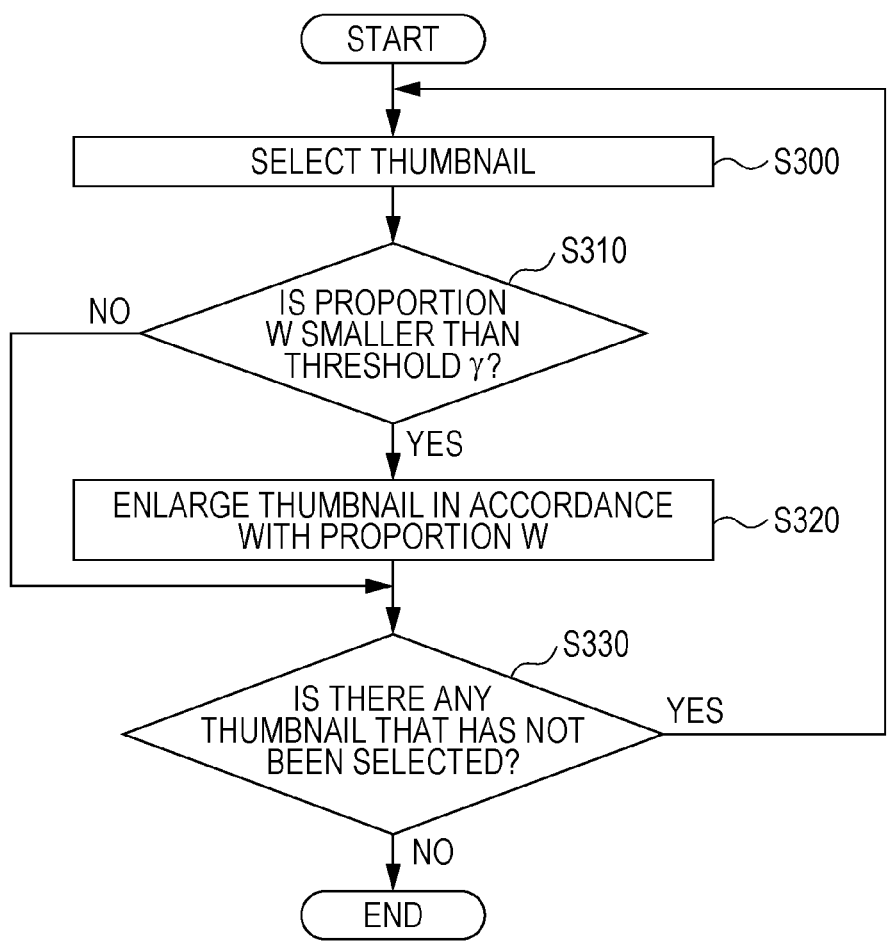
FIG. 9 is a flowchart illustrating an example of resizing processing for individually adjusting the sizes of thumbnails.

FIG. 9 is a flowchart illustrating another example of resizing processing executed by the CPU 21. In resizing processing in FIG. 9, the size of each thumbnail 8 is adjusted in accordance with the content of the corresponding document page. Resizing processing in FIG. 9 may be executed after thumbnail processing shown in FIG. 3.

In step S300, the CPU 21 selects one of the thumbnails 8 enlarged to a size greater than or equal to the threshold β.

In step S310, the CPU 21 judges whether the proportion W of the image region to the total size of the thumbnail 8 selected in step S300 is smaller than the threshold γ. If the proportion W is smaller than the threshold γ, the CPU 21 proceeds to step S320.

If the proportion W is smaller than the threshold γ, a user is less likely to recall the content of the document from the image contained in the selected thumbnail 8 than from the image in a thumbnail 8 having a proportion W greater than or equal to the threshold γ.

In step S320, the CPU 21 enlarges the size of the thumbnail 8 selected in step S300 in accordance with the proportion W. In this case, the CPU 21 may increase the size of the thumbnail 8 to be greater as the proportion W of the thumbnail 8 is smaller than the threshold γ.

If the proportion W is found to be greater than or equal to the threshold γ in step S310, the CPU 21 proceeds to step S330 by skipping step S320.

In step S330, the CPU 21 judges whether there is a thumbnail 8 that has not been selected in the document. If such a thumbnail 8 is found, the CPU 21 returns to step S300.

In step S300, the CPU 21 selects a thumbnail 8. In this manner, the CPU 21 repeats steps S300 through S330 until all the thumbnails 8 are selected. Then, the size of a thumbnail 8 having a proportion W smaller than the threshold γ is enlarged in accordance with the difference between the size of the thumbnail 8 and the threshold γ.

If it is found in step S330 that all the thumbnails 8 have been selected, the CPU 21 completes resizing processing shown in FIG. 9.

Figure 10A:
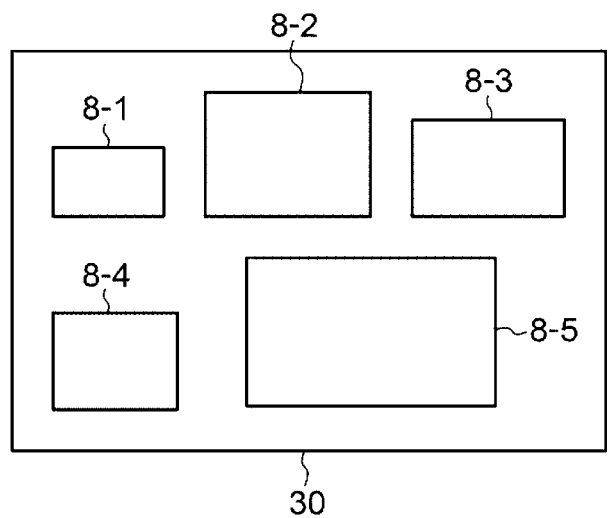
FIGS. 10A and 10B illustrate an example of resizing processing for individually adjusting the sizes of thumbnails and further adjusting the sizes of the thumbnails in the same row to be uniform.

FIG. 10A illustrates an example of a page 30 on which thumbnails 8 individually resized in resizing processing shown in FIG. 9 are arranged in the consecutive order of document pages. If it is necessary to distinguish individual thumbnails 8 from each other, as shown in FIG. 10A, each thumbnail 8 will be designated by "8-N" (N is a positive integer) for uniquely identifying each thumbnail 8.

The sizes of thumbnails 8 are individually adjusted, and thus, they are not uniform. When such thumbnails 8 are arranged on a page 30 in the consecutive order of document pages, it may be difficult for a user to identify the order of the thumbnails 8.

Figure 10B:
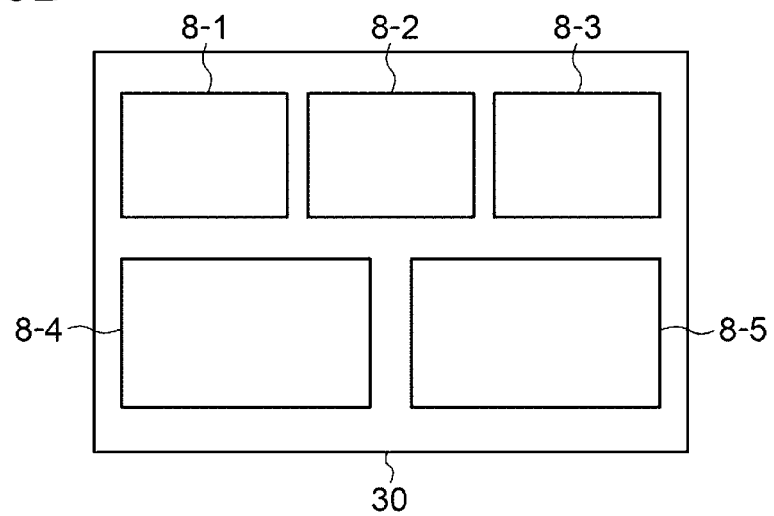

In this case, as shown in FIG. 10B, the CPU 21 may further adjust the size of each thumbnail 8 so that the sizes of thumbnails 8 displayed in the same row along a horizontal side of the page 30 will be uniform.

In the example in FIGS. 10A and 10B, the sizes of the thumbnails 8-1, 8-2, and 8-3 arranged in the first row are adjusted to the size of the largest thumbnail 8-2. The sizes of the thumbnails 8-4 and 8-5 arranged in the second row are adjusted to the size of the larger thumbnail 8-5.

Figure 11:
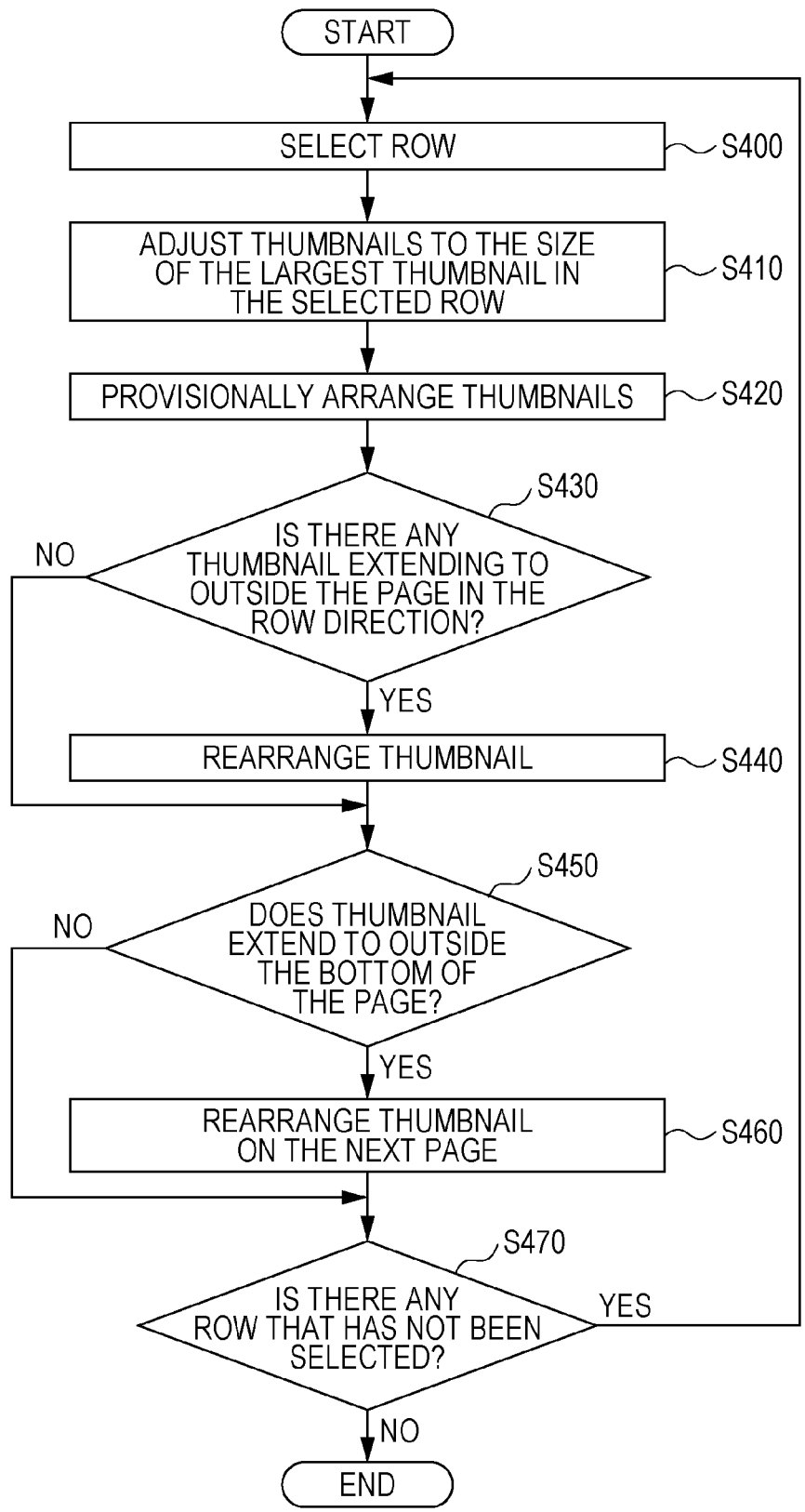
FIG. 11 is a flowchart illustrating an example of resizing processing for adjusting the sizes of thumbnails in each row.

FIG. 11 is a flowchart illustrating another example of resizing processing executed by the CPU 21. In resizing processing in FIG. 11, the sizes of thumbnails 8 in each row of a page 30 are adjusted to be uniform.

Resizing processing in FIG. 11 may be executed after the size of each thumbnail 8 is adjusted in resizing processing in FIG. 9.

In step S400, the CPU 21 selects a row of thumbnails 8 arranged on a page 30 that have been adjusted in resizing processing in FIG. 9. In this case, the CPU 21 selects a row in the top-down direction of the page 30.

In step S410, the CPU 21 adjusts the sizes of the thumbnails 8 in the selected row to the size of the largest thumbnail 8 in the same row. As a result, the sizes of the thumbnails 8 in each row are made uniform.

In step S420, the CPU 21 provisionally arranges the thumbnails 8 in the row selected in step S410.

In step S430, the CPU 21 judges whether there is any of the thumbnails 8 provisionally arranged on the page 30 which extends to outside the page 30 in the row direction. If such a thumbnail 8 is found, the CPU 21 proceeds to step S440.

In step S440, the CPU 21 rearranges such a thumbnail 8 in the next row in accordance with the order of document pages. In this case, the CPU 21 first returns the thumbnail 8 to the original size which has not been enlarged in step S410 and then rearranges the thumbnail 8 in the next row.

If it is found in step S430 that no thumbnails 8 extend to outside the page 30 in the row direction, the CPU 21 proceeds to step S450 by skipping step S440.

In step S450, the CPU 21 judges whether, as a result of rearranging the thumbnail 8 in step S440, the thumbnail 8 disposed in the next row extends to outside the bottom of the page 30. If such a thumbnail 8 is found in step S450, the CPU 21 proceeds to step S460.

In step S460, the CPU 21 rearranges the thumbnail 8 which extends to outside the bottom of the page 30 in the first row of the next page 30 without changing the order of thumbnails 8.

If it is found in step S450 that the rearranged thumbnail 8 does not extend to outside the bottom of the page 30, the CPU 21 proceeds to step S470 by skipping step S460.

In step S470, the CPU 21 judges whether there is any row that has not been selected. If there is such a row, the CPU 21 returns to step S400.

In step S400, the CPU 21 selects the next row of the page 30 that has not been selected (the first row of the next page 30 if all the rows have been selected on the current page 30). In this manner, the CPU 21 repeats steps S400 through S470, so that the sizes of thumbnails 8 in each row can be made uniform.

If it is found in step S470 that all the rows have been selected, the CPU 21 completes resizing processing shown in FIG. 11.

Figure 12A:
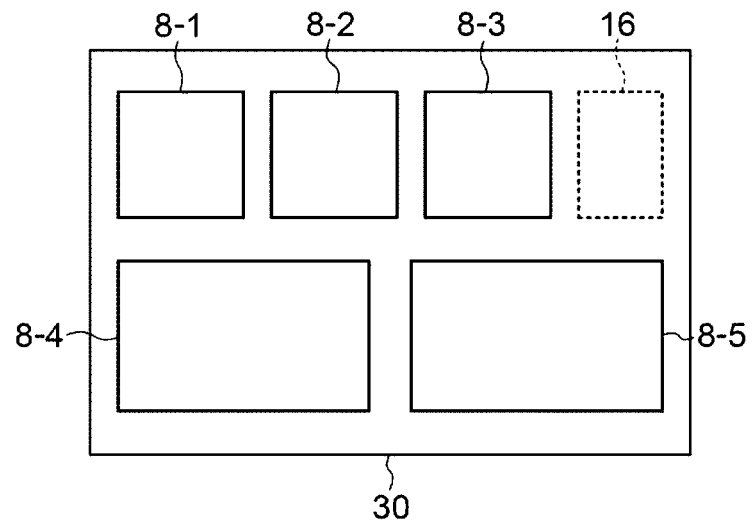
FIGS. 12A and 12B illustrate an example of resizing processing for adjusting the size of thumbnails to minimize a blank produced on a page.

FIG. 12A illustrates an example of a page 30 displayed on the screen after the sizes of thumbnails 8 in each row of the page 30 have been adjusted to be uniform in resizing processing in FIG. 11.

As shown in FIG. 12A, a blank indicated by a region 16 may be produced depending on the relationship between the size of enlarged thumbnails 8 and the size of the page 30. In this case, to fill the region 16, the CPU 21 may enlarge the thumbnails 8 (thumbnails 8-1 through 8-3 in the example of FIG. 12A) positioned in the same row as the region 16.

Figure 12B:
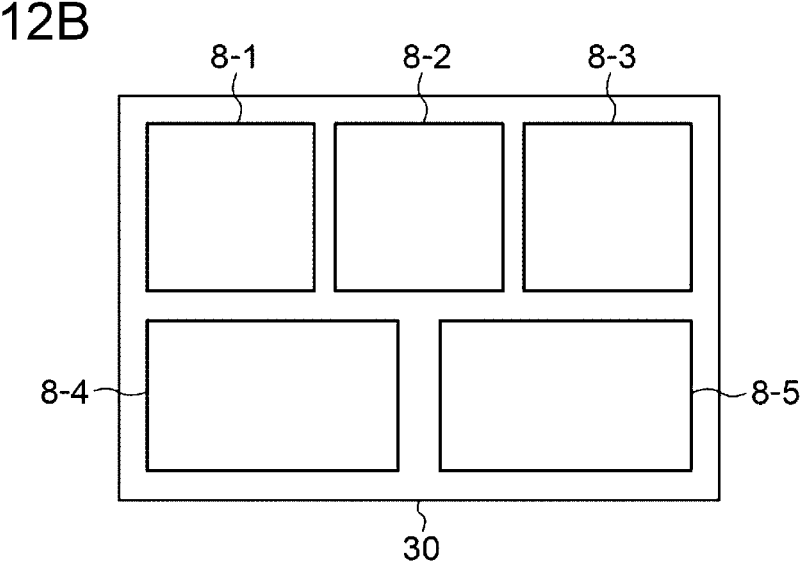

FIG. 12B illustrates an example of the page 30 displayed on the screen after the thumbnails 8 have been enlarged to fill the region 16. In this case, the CPU 21 enlarges the thumbnails 8 to have the same size.

If, as a result of enlarging the thumbnails 8, a thumbnail 8 included in the final row of the page 30 extends to outside the bottom of the page 30, the CPU 21 rearranges this thumbnail 8 in the first row of the next page 30. If, as a result of adding this thumbnail 8 to the next page 30, a thumbnail 8 included in the next page 30 extends to outside the bottom of the page 30, the CPU 21 rearranges this thumbnail 8 in the first row of the page 30 after next. If a thumbnail 8 successively extends to outside the bottom of each page 30 in this manner, the CPU 21 sequentially rearranges the thumbnail 8 in the following page 30.

As a result of the CPU 21 executing resizing processing in FIG. 11 to adjust the sizes of the thumbnails 8 displayed in each row to be uniform, a blank may be produced under the final row of the page 30.

Figure 13:
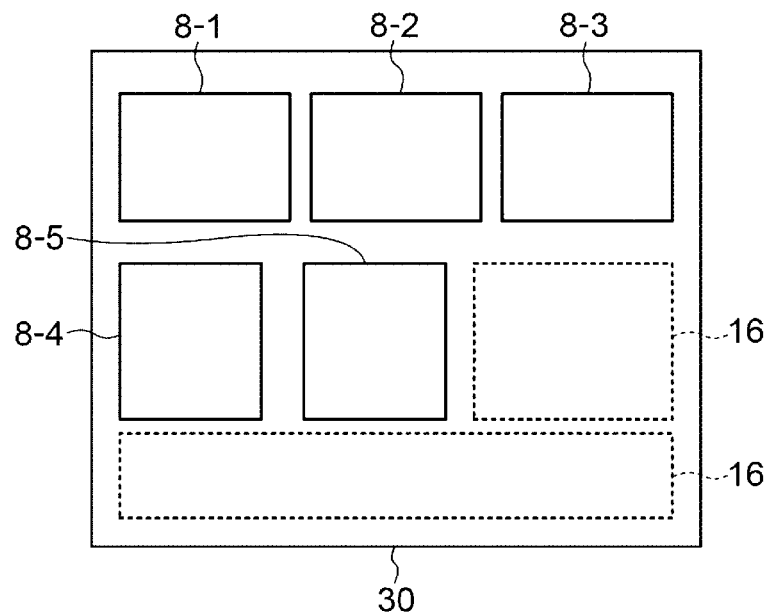
FIG. 13 illustrates an example in which a blank is produced in the final row of a page.

FIG. 13 shows an example of such a situation and illustrates blanks indicated by regions 16 produced in the final row and under the final row. To deal with such a situation, the CPU 21 may enlarge the thumbnails 8 in the final row to fill the regions 16 such that the thumbnails 8 in the final row (thumbnails 8-4 and 8-5 in the example of FIG. 13) have the same size. That is, the CPU 21 enlarges the vertical sides of the thumbnails 8 intersecting with the row-direction sides (horizontal sides) of the thumbnails 8 so as to minimize the blank under the final row.

Figure 14:
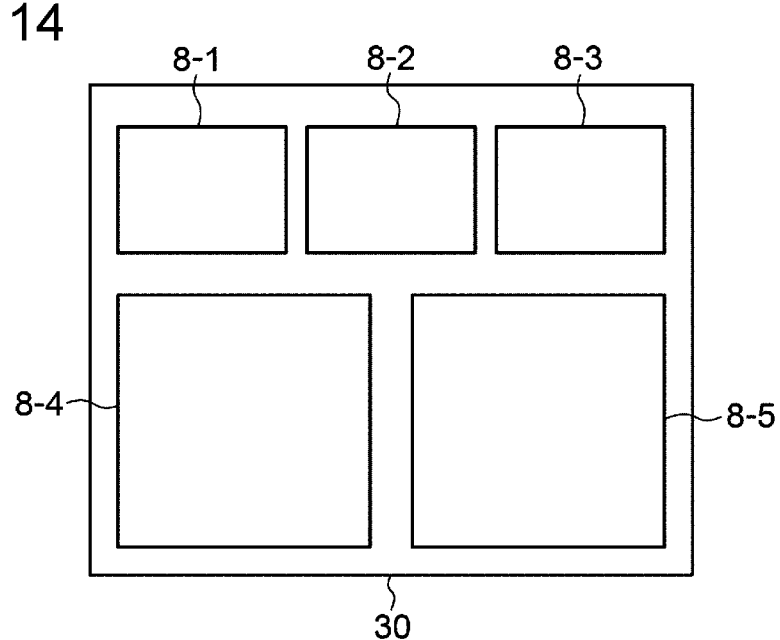
FIG. 14 illustrates an example in which the size of thumbnails in the final row of a page is adjusted to minimize a blank under the final row.

FIG. 14 illustrates an example of the thumbnails 8-4 and 8-5 enlarged to fill the regions 16.

As a result of enlarging thumbnails 8 to minimize a blank within a page 30, as shown in FIG. 14, the user is more likely to recall the content of the document than when a blank remains on a page 30.

Second Exemplary Embodiment

In the first exemplary embodiment, the information processing apparatus 10 autonomously adjusts the size of thumbnails 8 to be displayed on the screen. Alternatively, a user may give an instruction about the size of thumbnails 8 to be displayed on the screen to the information processing apparatus 10.

In a second exemplary embodiment, an information processing apparatus 10A that enlarges or reduces the size of thumbnails 8 in response to a user's instruction will be described.

Figure 15:
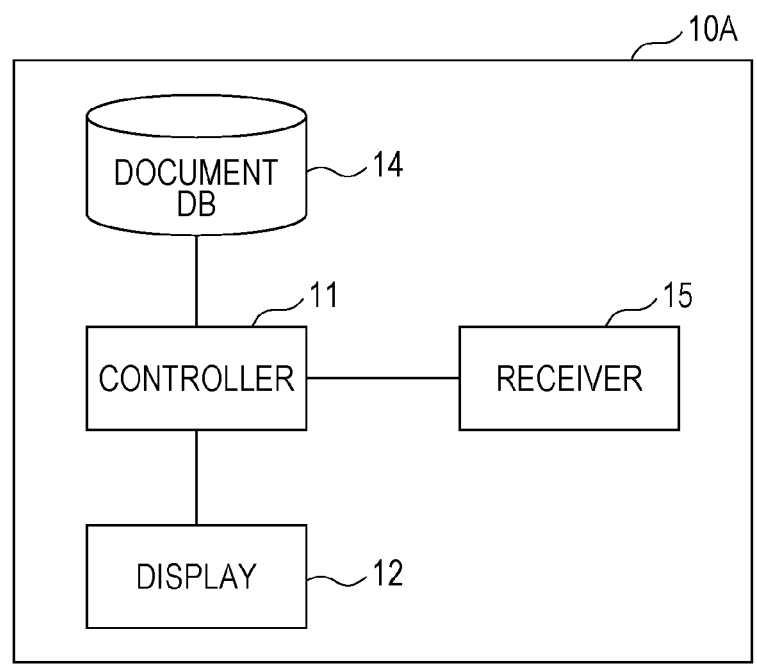
FIG. 15 is a block diagram illustrating an example of the functional configuration of an information processing apparatus according to a second exemplary embodiment.

FIG. 15 is a block diagram illustrating an example of the functional configuration of the information processing apparatus 10A according to the second exemplary embodiment. The functional configuration of the information processing apparatus 10A is similar to that of the information processing apparatus 10 shown in FIG. 1, except that the detector 13 is replaced by a receiver 15.

The receiver 15 is an example of a receiver in the second exemplary embodiment. The receiver 15 receives an instruction to enlarge or reduce the size of a thumbnail 8 (hereinafter such an instruction will be called a resizing instruction) from a user moving an indicator. The receiver 15 then informs the controller 11 of the moving distance of the indicator. If the indicator is a user's finger, the receiver 15 receives information indicating how much a user has moved a finger to give an instruction to enlarge or reduce the size of thumbnails 8, based on the movement of the finger touching a touchscreen, which is an example of the input unit 4. The touchscreen is fixed on the display unit 6 which displays the screen. Accordingly, touching the touchscreen with a finger may also be called touching the screen with a finger.

An example of user operation for enlarging the size of thumbnails 8 is a pinch-out operation, that is, a user opening two fingers to increase the distance therebetween. An example of user operation for reducing the size of thumbnails 8 is a pinch-in operation, that is, a user closing two fingers to decrease the distance therebetween.

The second exemplary embodiment will be described, assuming that the receiver 15 receives a resizing instruction as a result of a user performing a pinch-out operation or a pinch-in operation on the touchscreen. However, the resizing instruction is not restricted to these operations.

For example, the display 12 may control a projector, which is an example of the display unit 6, to display a screen on a wall, and a user may give a resizing instruction to adjust the size of thumbnails 8 by using a laser pointer, for example. In this case, the receiver 15 determines the type of operation and the moving distance of the laser pointer by using at least one of the direction, speed, acceleration, angular velocity, and angular acceleration concerning the movement of the laser pointer.

To perform a pinch-out or pinch-in operation, a user may not necessarily touch the touchscreen with a finger. Instead, a user may perform such an operation in midair without a finger touching the touchscreen. In this case, a camera captures an image of a pinch-out or pinch-in operation performed in midair, and the type of operation and the moving distance of a user's finger are determined by using a known motion detection technique and a known image processing technique.

Examples of the major components of the electrical system configuration of the information processing apparatus 10A are similar to those of the information processing apparatus 10 shown in FIG. 2. The information processing apparatus 10A is constituted by the computer 20.

The operation of the information processing apparatus 10A according to the second exemplary embodiment will now be discussed below.

FIG. 16 is a flowchart illustrating an example of resizing processing executed by the CPU 21 in response to an instruction to adjust the size of thumbnails 8 from a user. When a user wishes to improve the operability and the visibility of thumbnails 8 displayed on the screen, it performs a pinch-out operation. Resizing processing to be executed when a user has performed a pinch-out operation will be discussed below by way of example.

An information processing program describing resizing processing has been stored in the ROM 22 of the information processing apparatus 10A, for example. The CPU 21 of the information processing apparatus 10A reads the information processing program from the ROM 22 and executes resizing processing.

Before executing resizing processing in FIG. 16, the CPU 21 has already executed steps S10 and S20 of thumbnail processing in FIG. 3 as initial processing. That is, the CPU 21 has obtained a document selected by a user from the document DB 14 and adjusted the size of each thumbnail 8 so that the generated thumbnails 8 would be disposed within one page 30 in the same size and without overlapping each other.

In step S500, the CPU 21 judges whether a user has performed a pinch-out operation, based on the moving direction of a finger received from the touchscreen. If the user has not performed a pinch-out operation, the CPU 21 repeatedly executes step S500 to monitor the execution of a pinch-out operation.

If the user has performed a pinch-out operation, the CPU 21 proceeds to step S510.

In step S510, the CPU 21 judges whether the moving distance of a finger in a pinch-out operation has reached a prescribed amount. The prescribed amount is defined as follows. When the size of thumbnails 8 is enlarged by the prescribed amount, it is not possible to dispose the thumbnails 8 within an existing page 30 without causing the thumbnails 8 to overlap each other unless one more page 30 is added. Additionally, when the thumbnails 8 are enlarged by the prescribed amount, blanks on the pages 30 including the added page 30 can be minimized.

The prescribed amount is calculated in accordance with the number and the size of thumbnails 8 and the size of a page 30. If the moving distance of a finger in a pinch-out operation has reached the prescribed amount, the CPU 21 proceeds to step S520.

In step S520, the CPU 21 adds one more page 30 to arrange thumbnails 8.

In step S530, the CPU 21 enlarges the thumbnails 8 to the size corresponding to the prescribed amount. The CPU 21 then rearranges the enlarged thumbnails 8 on the individual pages 30 including the page 30 added in step S520 while maintaining the order of the thumbnails 8. In this case, the CPU 21 rearranges the thumbnails 8 so that the positions of the thumbnails 8 arranged on the individual pages 30 match each other.

For example, if twelve thumbnails 8 are distributed over two pages 30, six thumbnails 8 are arranged on the first page and six thumbnails 8 are arranged on the second page while maintaining the order of the thumbnails 8.

In step S540, the CPU 21 causes the display unit 6 to display the thumbnails 8 enlarged and rearranged in step S530 in units of pages 30 on the screen. As a result, the thumbnails 8 enlarged up to the size corresponding to the prescribed amount are displayed in units of pages 30 on the screen of the display unit 6.

If it is found in step S510 that the moving distance of a finger in a pinch-out operation has not reached the prescribed amount, the CPU 21 proceeds to step S550 by skipping steps S520 through S540.

In step S550, the CPU 21 judges whether the user has finished the pinch-out operation, based on information concerning whether a finger is still contacting the touchscreen.

If the pinch-out operation is still continuing, the CPU 21 returns to step S500 and repeatedly executes steps S500 through S550. In this manner, until the user finishes the pinch-out operation, every time the moving distance of a finger has reached the prescribed amount, the CPU 21 adds a page 30, and enlarges the thumbnails 8 by the prescribed amount and rearranges the enlarged thumbnails 8 on the pages 30. The CPU 21 then causes the display unit 6 to display the thumbnails 8 on the screen.

That is, the CPU 21 does not display the thumbnails 8 on the screen unless the user gives an instruction to enlarge them to the size corresponding to the prescribed amount. More specifically, the CPU 21 does not display the thumbnails 8 enlarged to a size corresponding to the moving distance of a finger on the screen until the thumbnails 8 are enlarged to a degree by which they are not possible to be displayed on an existing page 30 without overlapping each other unless another page 30 is added and until blanks on the pages 30 including the added page 30 can be minimized. Hence, the thumbnails 8 on the screen are not progressively enlarged in accordance with a change in the moving distance of a finger. Instead, every time the moving distance of a finger has reached the prescribed amount, the thumbnails 8 enlarged by the prescribed amount are displayed on the screen. That is, even if a user moves a finger to enlarge thumbnails 8, the size of the thumbnails 8 on the screen does not change unless the moving distance of the finger reaches the prescribed amount. In other words, the size of the thumbnails 8 on the screen is discontinuously changed.

If it is found in step S550 that the user has finished the pinch-out operation, the CPU 21 completes resizing processing in FIG. 16.

Figure 17A:
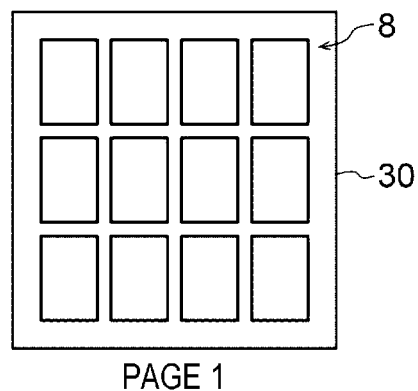
FIGS. 17A through 17C illustrate how the number of pages is changed in accordance with a pinch-out operation.
Figure 17B:
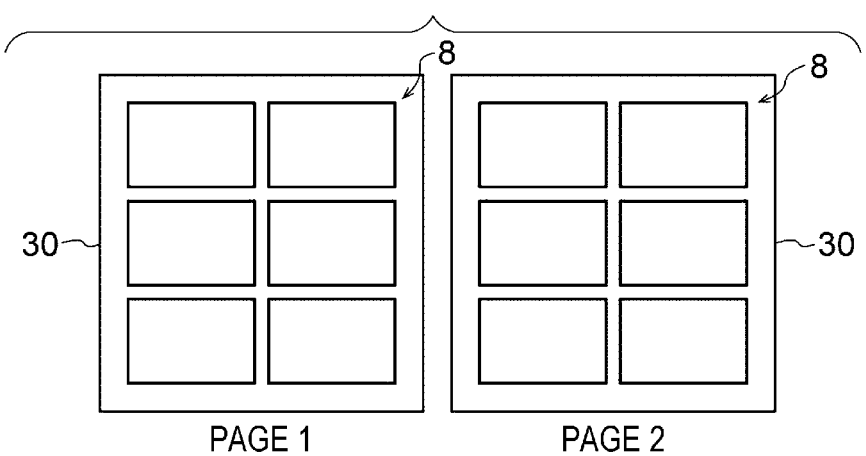
Figure 17C:
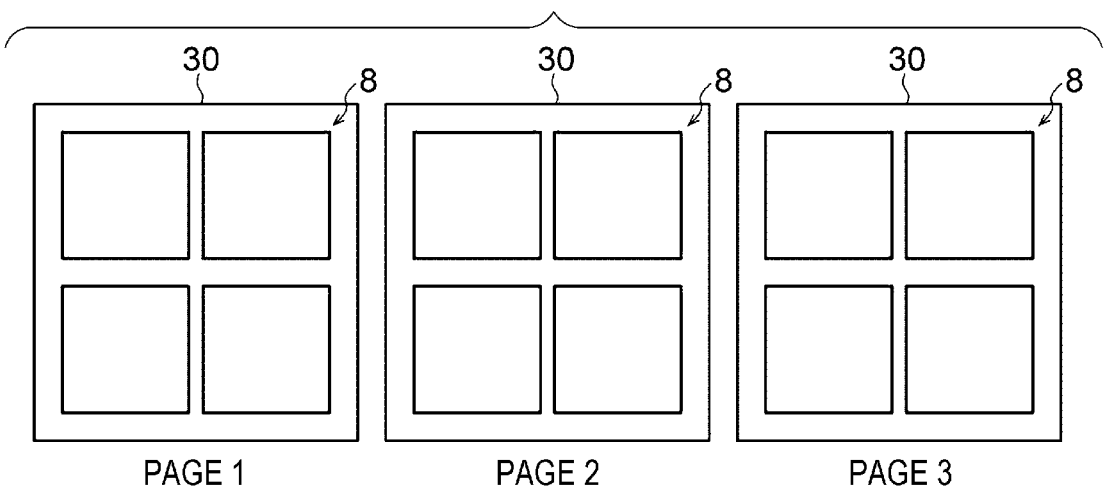

FIGS. 17A through 17C illustrate how the number of pages 30 is changed in accordance with a pinch-out operation processed in resizing processing in FIG. 16.

For example, twelve thumbnails 8 are displayed on the first page, as shown in FIG. 17A. Then, a user performs a pinch-out operation, and when the moving distance of a finger has reached the prescribed amount, the second page is added, and a set of enlarged six thumbnails 8 is disposed on each of the first page and the second page, as shown in FIG. 17B. If the pinch-out operation continues and when the moving distance of a finger has reached the prescribed amount again, the third page is added, and a set of enlarged four thumbnails 8 is disposed on each of the first through third pages, as shown in FIG. 17C.

Resizing processing executed in accordance with a pinch-out operation has been discussed with reference to FIG. 16. For a pinch-in operation, resizing processing is executed similarly.

Resizing processing executed in accordance with a pinch-in operation will be discussed below more specifically. Every time the moving distance of a finger in a pinch-in operation has reached a prescribed amount, the CPU 21 deletes one page 30. The CPU 21 then reduces the size of each thumbnail 8 by the prescribed amount in the pinch-in operation, and rearranges the reduced thumbnails 8 on each page 30 while maintaining the order of the thumbnails 8. In this case, the CPU 21 rearranges the thumbnails 8 so that the positions of the thumbnails arranged on the individual pages 30 match each other.

The prescribed amount in the pinch-in operation is defined as follows. When the size of thumbnails 8 is reduced by the prescribed amount, even if one page 30 is removed, the thumbnails 8 can still be included within existing pages 30 without overlapping each other, and also, blanks on the pages 30 after one page has been removed can be minimized.

As in the pinch-out operation, in the pinch-in operation, every time the moving distance of a finger reaches the prescribed amount, thumbnails 8 reduced by the prescribed amount are displayed. That is, even if a user moves a finger to reduce the size of thumbnails 8, the size of the thumbnails 8 on the screen does not change unless the moving distance of the finger reaches the prescribed amount. In other words, the size of the thumbnails 8 on the screen is discontinuously changed.

First Modified Example of Second Exemplary Embodiment

As described above, every time the moving distance of a finger has reached the prescribed amount in a pinch-out operation, the information processing apparatus 10A adds one more page 30 and displays the thumbnails 8 on the screen. To put it another way, even if a user moves a finger, the size of thumbnails 8 displayed on the screen may not change. It is thus preferable to display a display guide on a page 30 on which the thumbnails 8 are arranged. The display guide indicates how much a user is required to move a finger to display enlarged thumbnails 8.

Upon receiving information indicating that a user has touched the touchscreen with two fingers and started to open them to increase the distance therebetween, the information processing apparatus 10A may display page numbers on a line extending along the moving direction of the fingers. By looking at the position of each page number, a user can identify how much it is required to move a finger to display enlarged thumbnails 8.

Figure 18:
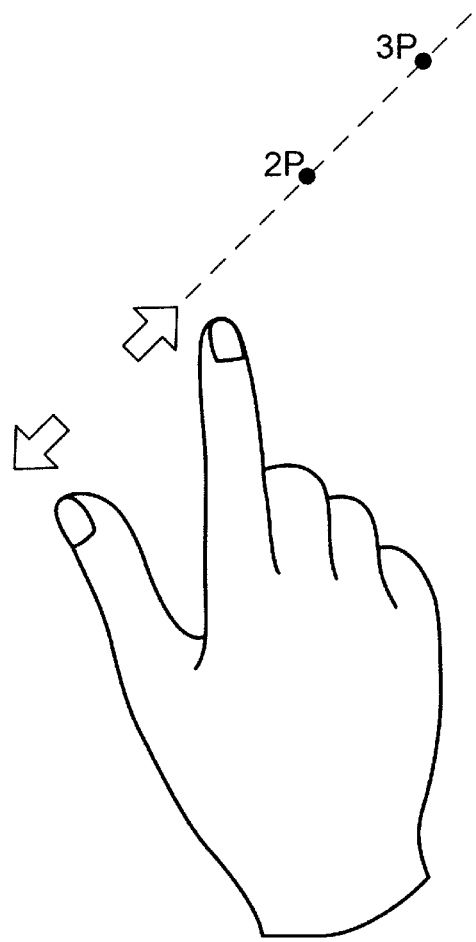
FIG. 18 illustrates an example of a display guide.

FIG. 18 illustrates an example of the display guide. When a user opens two fingers up to the position indicated by "2P", the enlarged thumbnails 8 are displayed over two pages, as shown in FIG. 17B. When the user opens two fingers up to the position indicated by "3P", the enlarged thumbnails 8 are displayed over three pages, as shown in FIG. 17C.

After opening two fingers to the position indicated by "3P" in FIG. 18, if the user performs a pinch-in operation to return one finger to the position indicated by "2P", the three pages displaying the thumbnails 8 are reduced to two pages.

Second Modified Example of Second Exemplary Embodiment

As thumbnails 8 are smaller, a user is required to move fingers by a greater distance to enlarge the thumbnails 8 to a predetermined size. The user may be even required to repeat a pinch-out operation many times to enlarge the thumbnails 8 to a predetermined size.

To deal with such a situation, even when the moving distance of a finger on the touchscreen is the same, the information processing apparatus 10A may vary the amount by which thumbnails 8 are enlarged in accordance with at least one of the size of the thumbnails 8 and the content of a document represented by the thumbnails 8.

Figure 19:
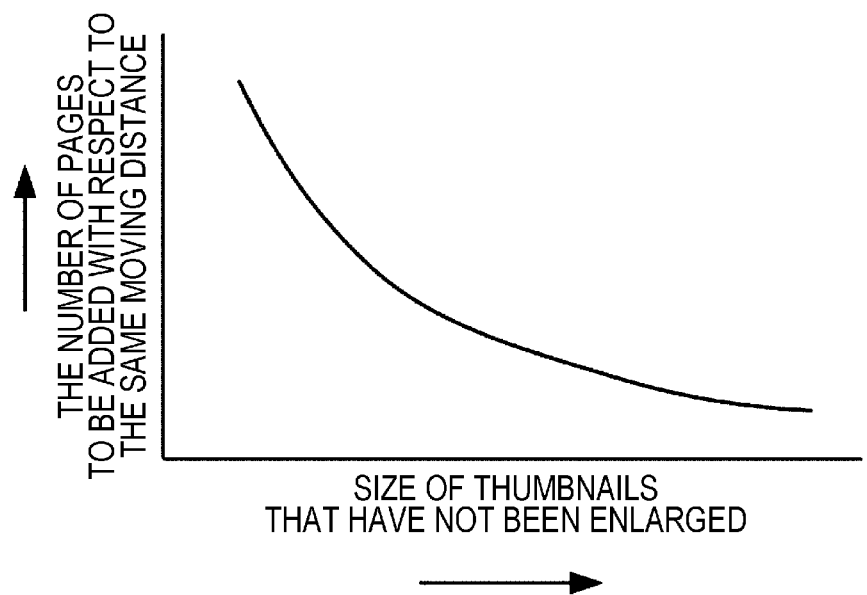
FIG. 19 is a graph illustrating an example of the relationship between the size of thumbnails that have not been enlarged and the number of pages to be added with respect to the same moving distance.

FIG. 19 is a graph illustrating an example of the relationship between the size of thumbnails 8 that have not been enlarged in a pinch-out operation and the number of pages to be added with respect to the same moving distance. In the graph in FIG. 19, the size of thumbnails 8 becomes larger in the direction indicated by the arrow on the horizontal axis. The number of pages to be added becomes greater in the direction indicated by the arrow on the vertical axis.

As shown in FIG. 19, the size of thumbnails 8 that have not been enlarged and the number of pages to be added with respect to the same moving distance is inversely proportional to each other. Accordingly, the number of pages to be added becomes greater as the size of thumbnails 8 is smaller. That is, as the size of thumbnails 8 is smaller, the amount by which thumbnails 8 are enlarged with respect to the same moving distance becomes greater. The relationship between the size of thumbnails 8 and the number of pages to be added indicated by the graph of FIG. 19 may be adjusted such that, regardless of the size of thumbnails 8, the thumbnails 8 are uniformly enlarged to the same size with respect to the same moving distance.

The detector 13 used in the first exemplary embodiment may be added to the information processing apparatus 10A. As discussed in the first exemplary embodiment with reference to FIG. 4, the detector 13 may calculate the proportion W of the image region to the total size of a corresponding thumbnail 8 that has not been enlarged and count the number S of thumbnails 8 having the proportion W greater than or equal to the threshold γ. The detector 13 may then calculate the ratio R of the number S of thumbnails 8 to the total number of thumbnails 8. In accordance with this ratio R, the information processing apparatus 10A may vary the amount by which thumbnails 8 are enlarged with respect to the same moving distance.

More specifically, to make a user recall the content of a document, as the ratio R of images to the total size of thumbnails 8 is smaller, the thumbnails 8 are required to be enlarged to be greater. The information processing apparatus 10A thus sets the amount by which the thumbnails 8 are enlarged to be greater with respect to the same moving distance.

Alternatively, the information processing apparatus 10A may calculate the proportion W of the image region to the total size of a corresponding thumbnail 8 that has not been enlarged. As the average of the proportions W of the individual thumbnails 8 is lower, the information processing apparatus 10A may set the amount by which the thumbnails 8 are enlarged to be greater with respect to the same moving distance.

By using the visual characteristics of characters contained in a thumbnail 8 as discussed in the first exemplary embodiment, the information processing apparatus 10A may vary the amount by which thumbnails 8 are enlarged with respect to the same moving distance.

For example, to make a user recall the content of a document, as the average of at least one of the differences in the color distribution of characters, character distribution, and blank distribution between adjacent thumbnails is smaller, the thumbnails 8 are required to be enlarged to be greater. The information processing apparatus 10A thus sets the amount by which the thumbnails 8 are enlarged to be greater with respect to the same moving distance.

First Modified Example for Both of First and Second Exemplary Embodiments

Modified examples concerning the displaying of thumbnails 8 that may be applicable to both of the information processing apparatus 10 of the first exemplary embodiment and the information processing apparatus 10A of the second exemplary embodiment will be described below. A first modified example will first be discussed.

The above-described information processing apparatuses 10 and 10A display thumbnails 8 in the consecutive order of pages 30. More specifically, for example, in a state in which the first page is displayed on the screen, to switch the first page to the third page, the second page is first displayed and then the third page is displayed, instead of directly switching the first page to the third page.

However, the information processing apparatuses 10 and 10A may not necessarily display thumbnails 8 in the consecutive order of pages 30.

FIG. 20 illustrates a display example of thumbnails 8 displayed by the information processing apparatuses 10 and 10A. As shown in FIG. 20, the information processing apparatuses 10 and 10A first arrange the thumbnails 8 in a size by which they can be contained within one page without overlapping each other.

The information processing apparatuses 10 and 10A then distribute the thumbnails 8 arranged on the single page 30 over multiple regions so that the thumbnails 8 can be enlarged to a size greater than or equal to the threshold α without overlapping each other and so that blanks in each region can be minimized when the thumbnails 8 are arranged on each of the multiple regions. In the example in FIG. 20, regions 30A and 30B are the multiple regions which will turn into new pages 30 after the thumbnails 8 are enlarged.

Dividing one page 30 into multiple regions may be implemented by executing processing described in the first and second exemplary embodiments. In the case of the information processing apparatus 10, for example, after executing thumbnail processing in FIG. 3, the information processing apparatus 10 first calculates the number of pages 30 required for disposing thumbnails 8 when they are enlarged such that blanks on the pages 30 can be minimized, and then stores the pages 30 and the thumbnails 8. In this case, the information processing apparatus 10 associates the thumbnails 8 with the pages 30 on which the enlarged thumbnails 8 will be arranged to indicate on which page 30 each of the enlarged thumbnails 8 will be displayed. Then, based on this association, the information processing apparatus 10 divides the original page 30 into multiple regions, which serve as new pages 30 on which the enlarged thumbnails 8 will be displayed. Then, to indicate the ranges of the divided regions, such as the ranges of the regions 30A and 30B, the information processing apparatus 10 displays dotted lines, for example, as indicated by the left section of FIG. 20.

In FIG. 20, if the region 30A, for example, is selected by a user, the information processing apparatus 10 displays a page 30A corresponding to the region 30A and the thumbnails 8 associated with the page 30A on the screen. If the region 30B is selected by a user, the information processing apparatus 10 displays a page 30B corresponding to the region 30B and the thumbnails 8 associated with the page 30B on the screen.

In the case of the information processing apparatus 10A, assuming that a user performs a pinch-out operation so that the number of pages will be increased to a predetermined number (two pages, for example), the information processing apparatus 10A stores thumbnails 8 which will be disposed on these pages 30. In this case, the information processing apparatus 10A associates the thumbnails 8 with the pages 30 on which the enlarged thumbnails 8 will be arranged to indicate on which page 30 each of the enlarged thumbnails 8 will be displayed. Thereafter, in a manner similar to the information processing apparatus 10, based on this association, the information processing apparatus 10A divides the original page 30 into multiple regions, which will serve as new pages 30 on which the enlarged thumbnails 8 will be displayed. The information processing apparatus 10A then indicates the ranges of the divided regions on the original page 30.

The regions corresponding to the pages 30 on which the enlarged thumbnails 8 will be displayed are sequentially disposed from top left to right on the original page 30 in the row direction in the consecutive order of pages 30. When the regions are disposed up to the right edge of the first row of the original page 30, the remaining regions are sequentially disposed on the next row from left to right. In this manner, the divided regions are arranged in the predetermined direction in the consecutive order of pages 30. This allows a user to identify on which page 30 a thumbnail 8 displayed on the screen will be disposed, based on the positions of the divided regions.

When the page 30A corresponding to the selected region 30A is displayed on the screen, as indicated in the middle section of FIG. 20, it may be further divided into multiple sub-regions (regions 30C and 30D, for example). If, for example, the region 30C is selected on the page 30A, the information processing apparatus 10A displays a page 30C corresponding to the region 30C on the screen, as indicated in the right section of FIG. 20. In this manner, the information processing apparatuses 10 and 10A may further divide a region corresponding to one page 30 into multiple sub-regions corresponding to plural pages 30.

In this case, the information processing apparatuses 10 and 10A may indicate the ranges of sub-regions, such as the ranges of the regions 30C and 30D, by using dotted lines within the region 30A corresponding to the page 30A, as indicated by the middle section of FIG. 20.

Second Modified Example for Both of First and Second Exemplary Embodiments

In the above-described exemplary embodiments and modified examples, the information processing apparatuses 10 and 10A dispose thumbnails 8 so that blanks in the pages 30 can be minimized or so that the positions of the thumbnails 8 arranged on the individual pages 30 match each other. In the case of such an arrangement of thumbnails 8, the positions of page breaks are determined merely based on the size of thumbnails 8 to be disposed on the pages 30. That is, no particular meaning is involved in the relationship between the thumbnails 8 and the pages 30.

The thumbnails 8 and the pages 30 may be related to each other based on the content of a document. A document is usually constituted by multiple parts according to the content of the document. For example, chapters are an example of parts divided from a document based on the content. In addition to chapters, sections and sub-sections are also examples of parts divided from a document. If a set of thumbnails 8 in one part are disposed on the same page 30, a user is able to more easily recall the content of the document from the number of parts and the number of thumbnails 8 (the number of document pages) in each part than when thumbnails 8 are randomly disposed on pages 30 regardless of the parts of the document.

The information processing apparatuses 10 and 10A may distribute thumbnails 8 that have been enlarged to a size greater than or equal to the threshold $\alpha$ according to the parts of a document, and then dispose the thumbnails 8 so that a set of thumbnails 8 in one part will be contained within the same page 30. That is, the information processing apparatuses 10 and 10A display the enlarged thumbnails 8 in association with the pages 30 so that the pages 30 can be switched from one to another based on the parts of the document.

If it is not possible to dispose a set of thumbnails 8 in one part on the same page 30 without causing them to overlap each other, the information processing apparatuses 10 and 10A may distribute the thumbnails 8 in the same part over plural pages 30.

FIG. 21A illustrates an example of pages 30 on which thumbnails 8 are disposed according to the chapter of a document. For example, if the document is constituted by ten chapters, thumbnails 8 corresponding to the document pages forming the first chapter are disposed on the first page, and thumbnails 8 corresponding to the document pages forming the second chapter are disposed on the second page, as shown in FIG. 21A. Thereafter, thumbnails 8 corresponding to the document pages forming each of the third through tenth chapters are disposed on the same page 30.

In this arrangement of thumbnails 8, even if a blank is produced within a page 30, the thumbnails 8 are not rearranged, that is, a thumbnail 8 contained in another chapter is not moved to the page 30 including a blank. The information processing apparatuses 10 and 10A may enlarge the thumbnails 8 so that a blank contained in the page 30 can be minimized.

To effectively utilize blanks, as shown in FIG. 21B, the information processing apparatuses 10 and 10A may display a thumbnail 8A included in the next or following chapter in a blank on the current page 30. In this case, the information processing apparatuses 10 and 10A display the thumbnail 8A in a different display mode from that for the thumbnails 8 on the current page 30.

The information processing apparatuses 10 and 10A perform image processing in advance so that the thumbnail 8A in another chapter can be visually distinguished from the thumbnails 8 on the current page 30. For example, the thumbnail 8A may be blurred so as to be less sharp than the thumbnails 8 on the current page 30.

As a result of the information processing apparatuses 10 and 10A displaying the thumbnail 8A of a different chapter in a blank of the current page 30, a user can be informed that the current page 30 continues to another page 30. As a result of changing the display mode of the thumbnail 8A from that for the thumbnails 8 on the current page 30, a user can also be informed that the thumbnail 8A belongs to a different chapter.

When displaying the thumbnail 8A of a different chapter in a blank of the current page 30, the information processing apparatuses 10 and 10A do not move the thumbnail 8A to the blank, but copy the thumbnail 8A, perform image processing on the copied thumbnail 8A, and then dispose it in the blank.

Third Modified Example for Both of First and Second Exemplary Embodiments

In the above-described second modified example, thumbnails 8 are arranged according to the chapter of a document, and a set of thumbnails included in the same chapter is disposed on the same page 30. To let a user know that a current page 30 continues to the following page 30, a thumbnail 8 in the following chapter is disposed in a blank of the current page 30.

A user may wish to check whether a current page 30 displayed on the screen continues to the following page 30. It is thus preferable to add information indicating whether the current page 30 has a preceding or following page 30. If the current page 30 has a preceding or following page 30, it is also preferable to give some kind of indication on the current page 30 to let a user know how to display the preceding or following page 30.

The information processing apparatuses 10 and 10A thus first reserve a space within each page 30 where an instruction to switch the page 30 can be received, and then dispose thumbnails 8 on the page 30. Hereinafter, such a space will be called a receiving region.

The receiving region is provided at an end portion of a page 30, for example. The end portion of a page 30 is a portion where thumbnails 8 are not disposed and also provided along a side of the page 30, as shown in FIG. 22. In the example in FIG. 22, a region having a width L1 positioned along each of the left and right vertical sides of a page 30 is an end portion of the page 30. A region having a width L2 positioned along each of the top and bottom horizontal sides of the page 30 is also an end portion of the page 30.

If the page 30 is switched in the horizontal direction, the information processing apparatuses 10 and 10A set an end portion (first end portion) provided at a vertical side of the page 30 as the receiving region for receiving an instruction to switch the page 30. If the page 30 is switched in the vertical direction, the information processing apparatuses 10 and 10A set an end portion (second end portion) provided at a horizontal side of the page 30 as the receiving region for receiving an instruction to switch the page 30. In this manner, the receiving region is set to match the switching direction of the pages 30.

To show a user whether the receiving region is set at the first end portion or the second end portion, the information processing apparatuses 10 and 10A set the width of the end portion with the receiving region to be longer than that without the receiving region.

In the example in FIG. 22, the width L1 is set to be longer than the width L2 to indicate that the receiving region is set at the first end portion. If the receiving region is set at the second end portion, the width of the second end portion is set to be longer than that of the first end portion.

The information processing apparatuses 10 and 10A may also display a drawing, such as an icon, at an end portion with the receiving region indicating that a current page 30 has a preceding or following page 30, as well as setting the width of the end portion with the receiving region to be longer than that of the end portion without the receiving region.

In the example in FIG. 22, a triangular icon 28 indicating the switching direction of a page 30 is displayed at the first end portion. No page precedes the first page 30 and no page follows the final page 30, and the receiving region is not set at the first end portion on the left side of the first page 30 and that on the right side of the final page 30. Accordingly, the information processing apparatuses 10 and 10A do not display an icon 28 at the first end portion where the receiving region is not set.

Fourth Modified Example for Both of First and Second Exemplary Embodiments

In the above-described exemplary embodiments and modified examples, thumbnails 8 are sequentially disposed from top left to right on a page 30 in the row direction in the consecutive order of document pages. When thumbnails 8 are disposed up to the right edge of the first row, the remaining thumbnails 8 are sequentially disposed on the next row from left to right.

In some cases, however, it may be preferable to determine the arrangement direction of thumbnails 8 in accordance with the type of language described in a document represented by the thumbnails 8.

For example, in some languages, such as English and German, a document is read from left to right. In some languages, such as Arabic and Hebrew, a document is read from right to left. In the case of a document described in a language read from right to left, it is more preferable to arrange thumbnails 8 from right to left so that a user can read the document better because the eye direction matches the arrangement direction of the thumbnails 8.

The information processing apparatuses 10 and 10A may thus determine the arrangement direction of thumbnails 8 in accordance with the type of language used in a document.

In this case, the information processing apparatuses 10 and 10A obtain information concerning a language used in a document from the properties of the document, for example. The information processing apparatuses 10 and 10A then refer to a language table stored in the non-volatile memory 24 and determine the arrangement direction of thumbnails 8. In the language table, the languages and the arrangement direction of thumbnails 8 are associated with each other.

Some languages have multiple writing directions. Japanese, for example, has vertical writing and horizontal writing systems.

In the case of horizontal writing, it is preferable to arrange thumbnails 8 from left to right so that a user can read the document better because the eye direction matches the arrangement direction of the thumbnails 8. In the case of vertical writing, it is preferable to arrange thumbnails 8 from top to bottom rather than from left to right so that a user can read the document better.

The information processing apparatuses 10 and 10A may thus determine the arrangement direction of thumbnails 8 in accordance with the writing direction of a language used in a document.

The present disclosure has been discussed through illustration of the exemplary embodiments. However, the disclosure is not restricted to the technical range of the above-described exemplary embodiments. Various modifications and/or improvements may be made to the exemplary embodiments without departing from the spirit and scope of the disclosure. Exemplary embodiments obtained by making modifications and/or improvements are also encompassed within the technical range of the disclosure. For example, the order of operations may be changed without departing from the spirit and scope of the disclosure.

In the above-described exemplary embodiments, thumbnail processing, content detection processing, and resizing processing are implemented by software by way of example. However, operations equivalent to those shown in the flowcharts of FIGS. 3, 4, 6, 8, 9, 11, and 16 may be implemented by using hardware, such as an application specific integrated circuit (ASIC). In this case, operations are executed faster than those implemented by software.

Although the information processing program is installed in the ROM 22 in the above-described exemplary embodiments, it may be provided in a different manner. For example, the information processing program may be provided as a result of being recorded in a computer-readable storage medium, for example, in an optical disc, such as a compact disc (CD)-ROM or a digital versatile disc (DVD)-ROM, or in a semiconductor memory, such as a universal serial bus (USB) memory or a flash memory. The information processing apparatuses 10 and 10A may obtain the information processing program from an external device connected to a communication line, which is not shown.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a display panel and a processor coupled to the display panel, the processor is configured to
obtain information represented by each of a plurality of thumbnails;
for each thumbnail of the plurality of thumbnails, detect a proportion of an image included in the thumbnail to a total size of the thumbnail;
individually determine a size of each of the plurality of thumbnails based on the detected proportion of each respective thumbnail; and
perform control so that the plurality of thumbnails are displayed on the display panel in a size greater than or equal to the determined size according to the proportion.

2. The information processing apparatus according to claim 1, wherein the size of each of the thumbnails to be displayed in the determined size or greater is set in accordance with the content of a corresponding thumbnail and a size and a resolution of a screen for displaying the plurality of thumbnails.

3. The information processing apparatus according to claim 2,
wherein the processor performs control so that, as a ratio of the number of thumbnails that are found to have the proportion greater than or equal to a threshold to a total number of the plurality of thumbnails is increased, the size of each of the thumbnails to be displayed in the size greater than or equal to the determined size is decreased.

4. The information processing apparatus according to claim 3, wherein the processor performs control so that the size of each of the thumbnails adjusted by using the proportion will further be adjusted based on visual characteristics of characters included in a corresponding thumbnail.

5. The information processing apparatus according to claim 4, wherein, if a difference in a color distribution of the characters between adjacent thumbnails is greater than a predetermined threshold, the processor performs control so that the size of each of the thumbnails to be displayed in the size greater than or equal to the determined size is decreased to be smaller than the size of a corresponding thumbnail that was adjusted using the proportion.

6. The information processing apparatus according to claim 4, wherein, if a degree of similarity concerning an arrangement of the characters between adjacent thumbnails is smaller than a predetermined degree of similarity, the processor performs control so that the size of each of the thumbnails to be displayed in the size greater than or equal to the determined size is decreased to be smaller than the size of a corresponding thumbnail that was adjusted using the proportion.

7. The information processing apparatus according to claim 6, wherein, to calculate the degree of similarity concerning the arrangement of the characters, the processor uses at least one of a thickness, a size, and a type of the characters.

8. The information processing apparatus according to claim 4, wherein, if a difference in a distribution of blanks between adjacent thumbnails is greater than a predetermined threshold, wherein the blanks are included in a thumbnail, the processor performs control so that the size of each of the thumbnails to be displayed in the size greater than or equal to the determined size is decreased to be smaller than the size of a corresponding thumbnail that was adjusted using the proportion.

9. The information processing apparatus according to claim 3, wherein the sizes of the thumbnails are individually adjusted and displayed in the size greater than or equal to the determined size, and the processor performs control so that, among the adjusted thumbnails, sizes of thumbnails displayed in the same row along a horizontal side of a page will be uniform.

10. The information processing apparatus according to claim 9, wherein the processor performs control so that the thumbnails displayed in the same row of the page are enlarged up to a size of the largest thumbnail displayed in the same row.

11. The information processing apparatus according to claim 9, wherein the processor performs control so that a vertical side of the thumbnails intersecting a horizontal side of the thumbnails displayed in a final row of the page is further enlarged to minimize a blank produced under the final row.

12. The information processing apparatus according to claim 1,
wherein the processor is further configured to receive an instruction to enlarge the size of a thumbnail in accordance with an amount by which an indicator is moved,
wherein the processor performs control so that the size of each of the plurality of thumbnails is displayed in the size greater than or equal to the determined size in accordance with the instruction received by the processor and the plurality of thumbnails displayed in the size greater than or equal to the determined size.

13. The information processing apparatus according to claim 12, wherein the processor performs control so that the thumbnails displayed in accordance with the instruction will not be displayed on a screen for displaying the plurality of thumbnails until the thumbnails are enlarged to such a degree by which it is not possible to dispose the thumbnails within an existing page without causing the thumbnails to overlap each other unless another page is added.

14. A non-transitory computer readable medium storing a program causing a computer to execute a process, the process comprising:
- obtaining information represented by each of a plurality of thumbnails;
- for each thumbnail of the plurality of thumbnails, detecting a proportion of an image included in the thumbnail to a total size of the thumbnail;
- individually determining a size of each of the plurality of thumbnails based on the detected proportion of each respect thumbnail; and
- performing control so that the plurality of thumbnails are displayed in a size greater than or equal to the determined size according to the proportion.

* * * * *